Oct. 6, 1964   L. M. RODGERS   3,152,315
AIRCRAFT TRACKING AND INDICATING SYSTEM
Filed Jan. 27, 1961   5 Sheets-Sheet 1
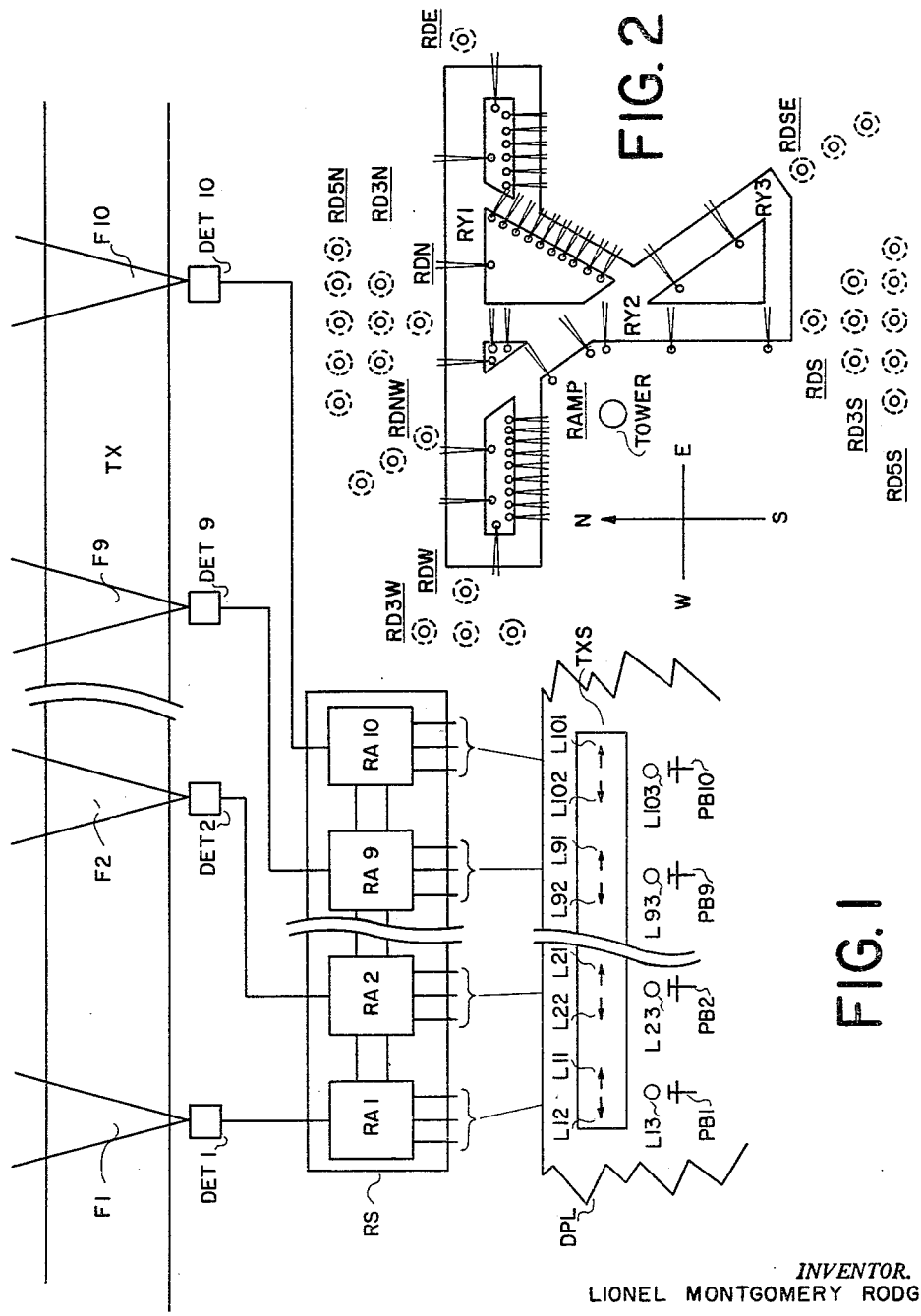
*INVENTOR.*
LIONEL MONTGOMERY RODGERS
BY
Edward W. Eames
ATTORNEY Oct. 6, 1964 L. M. RODGERS 3,152,315
AIRCRAFT TRACKING AND INDICATING SYSTEM
Filed Jan. 27, 1961 5 Sheets-Sheet 2

*INVENTOR.*
LIONEL MONTGOMERY RODGERS
BY
Edward H. Earns
ATTORNEY

INVENTOR.
LIONEL MONTGOMERY RODGERS
BY
Edward W. Evans
ATTORNEY

INVENTOR.
LIONEL MONTGOMERY RODGERS

United States Patent Office 3,152,315
Patented Oct. 6, 1964

3,152,315
AIRCRAFT TRACKING AND INDICATING
SYSTEM
Lionel Montgomery Rodgers, Norwalk, Conn., assignor to Laboratory for Electronics, Inc., Boston, Mass., a corporation of Delaware
Filed Jan. 27, 1961, Ser. No. 85,413
12 Claims. (Cl. 340—23)

The present invention relates to a traffic indicating system or traffic surveillance system, particularly adapted for use in connection with traffic at or on an airport or other restricted facility, and particularly for providing a system which will detect presence of a vehicle, such as a surface vehicle or an airborne vehicle, when entering upon or into a controlled area such as an ascent or descent air corridor adjacent to a runway, or a runway or taxi strip and upon continuation of such vehicle along the corridor or runway to determine and provide an indication of the direction of travel of such vehicle in or along such corridor or runway and to track such detected vehicle through actuation of the vehicle itself, such indication made remotely as on a display panel or on a miniature layout of such air corridor and runway and to terminate through an actuation of the vehicle itself at a point of departure from the air corridor, runway, or taxi strip. The size of some present day air terminals or airports precludes visual observation of the entire operations on the airport even during daylight hours and particularly when weather conditions reduce visibility. During the hours of darkness visual observation of operations at such facilities is substantially reduced while inclement weather, which may of itself not necessitate reduction of operations at such facility, may further reduce visual information about operations during such hours of darkness.

Flight and navigational aids, within aircraft themselves and other aids located at or near an airport, permit flight operations from airports during weather conditions which normally inhibit visual access to the entire operations on an airport. The size, and in particular the length, of present day runways sometimes places the point of take-off of aircraft at substantial distances from the control tower. Thus the distance at which aircraft operations are taking place from the tower, aggravated by inclement weather conditions and further aggravated by limited night vision, at times precludes actual visual observation of operations.

Under such conditions, other means of determining the position of vehicles using the airport must be relied upon, as for example, radio communication between the aircraft and the control tower, or observation of operations by radar or other complex means, generally located on or near the airport. Radio communication between aircraft and the tower is limited since, practically, communication can be between only two principals at one time. Where two or more aircraft are on the ground or in the vicinity of an airport and each is trying to contact the tower of the airport to report its position, for example, one aircraft must wait for the other aircraft to finish its report to the tower before entering into its own conversation with the tower to report its own position.

Heavy aircraft traffic requires extensive communication between aircraft and the control tower even on days when weather conditions permit visual observation of the entire operations on and above the airport. On days when weather conditions reduce visibility and at night when vision is limited by darkness, radio communications between aircraft and the control tower is greatly increased so that often the capacity of the airport is limited by the capacity of the radio communications channel or channels.

Several types of surface surveillance systems have been proposed, including the use of radar to sweep the entire airport and to indicate traffic thereon. Generally, such systems indicate pictorially the operations on an airport on an instantaneous basis which necessitates substantially constant observation of the pictorial receiver. The image provided by such radar system must be interpreted by visual observation since such surface surveillance system itself does not direct attention to particular conditions, operations and events occuring, nor in particular, direct attention to potentially dangerous conditions which may occur on and above the airport.

The present invention may, very well, be employed as supplementary equipment on an airport where such surface surveillance system may be in use. The combination of such surface surveillance system and the present invention at an airport would provide very little overlap of information since one system would complement the other rather than provide duplicated information.

Where a radar surface surveillance system may show pictorially the operations on the surface of the airport the present improved traffic indicating system will provide indications of such operations which may be presented on a miniature layout on the airport itself so as to indicate approximate positions of aircraft operating on and above the airport and will provide alarms directing the attention of the traffic director to potentially dangerous occurrences on the airport itself.

When used as the sole indicating system of airport traffic, the present invention provides a greatly improved traffic indicating system for use at an airport or air terminal which indicating system operates through actuation of the traffic itself, which may be on the surface of the airport, airborne in the ascent or descent corridors leaving or approaching a runway, or somewhat above the runway, for example. Continued indication of the indicating system is dependent upon actuation, by the initiating vehicle, of spaced detection stations between initiation and ultimate termination, and termination of indication of the indicating system is made through actuation of one of the termination sections by the same vehicle.

The present invention provides a detection system, including a series of detection stations which in effect sectionalize a predetermined pathway which may be all or part of an ascent or descent corridor from and to a runway, the runway itself, and/or the normal taxi strips, or taxi ways of an airport. Each detection station may include one or more detection devices, a relay assembly, detection and direction indicators and certain alarms with the indicators and alarms associated with a display panel which may be a miniature layout of the path on which such indications occur. The detector device for taxiways and runways may be of the ordinary vehicle detector type designed to close a set of contacts for completion of an electrical circuit upon actuation.

The preferred form of invention includes the use of radar detectors or microwave radiant type detectors that provide a directed beam of microwave radiant energy so that when a vehicle is traveling on the surface or somewhat above the surface of the ground, on the controlled path, detection is made when such vehicle passes through the projected beam and actuates the detector device. Where vehicles are expected to proceed along a relatively confined area, such as a taxi strip or runway, a detector device, such as a microwave radiant energy type detector device, for example, may be used at each detection station where the confined beam is directed across such confined area so that an aircraft or other vehicle must pass through such beam while proceeding along such confined area. However, where vehicles are less laterally restricted, such as while airborne in an ascent or descent corridor, multiple detector devices may be used at one detection station where each detector is located on the ground arranged in a line which is perpendicular to the center line of the runway with the confined beam of each detector directed substantially vertically upward so that the joint or aggregate beams combine to form a vertical wall of radiant energy substantially longer than the width of the runway. Thus an aircraft in such ascent or descent corridor would pass through the radiant energy wall formed by the aggregate beams of the multiple detectors and actuate at least one detector device of the detection stations. Since it is also desired to know the angle of lateral approach of an aircraft, relative to the center line of a runway, indicators individual, to each detector of one detection station having multiple detectors, may be provided to indicate which detector of a multiple detector detection station is actuated, thus indicating the azimuth angle of approach of an ascending or descending aircraft as it passes over and actuates one or more detectors of the detection station in the air corridor.

The relay assemblies, one of which is associated with each detection station, may be identical to each other, and are interconnected identically except for the relay assembly of the first detection station and the relay assembly of the last detection station of a particular series, all as described and illustrated below. Since the relay assembly of the first detection station in a series of detection stations cannot be connected to a forward adjacent unit, a "first" relay assembly has jumper connections unique to it at its "open" side. The "last" or "final" relay assembly in a series of detection stations which cannot be connected to another relay assembly at its "open" side also has certain jumper connections which extend off the "open" end. These "end" jumper connections also are illustrated and described below.

In its preferred form the display panel of the present invention may be in the form of a layout of the airport runways, adjacent air corridors and taxi strips in miniature, and may have indicator lamps on or next to the miniature layout in positions corresponding to the location of the detector with which the indicators are associated. Each set of indicator lamps may be in a set of three indicators and may be in the form of two arrows, each facing in opposite directions along the miniature layout, with a circular or a bar indicator between and below the arrows, forming a third illuminated indicator on the panel, associated with one detector.

In the description below, when read with the accompanying drawings, it will be fully disclosed how this present greatly improved traffic indicating system or airport surveillance system, through traffic initiation, traffic continuation, and traffic termination accurately indicates the operation of traffic entering upon, traveling upon and departing from the controlled areas of an airport. The present system indicates the point of entrance of vehicles into the controlled area, indicates the direction of travel of such vehicle, after determination of such direction, its relative velocity or progress, its continued progress along the controlled area, its relative position on the controlled area at all times with respect to the detector last acuated and its exit from the controlled area, all through actuation of the traffic itself and all conveniently displayed on the display panel.

It is therefore an object of the present invention to provide an improved traffic indicating or surveillance system for an airport or other restricted facilities which is initiated into indication, continually operated and thereafter terminated through actuation of the traffic over which such surveillance is made.

Another object is to provide an improved traffic indicating or surveillance system for an airport which will indicate the presence of an aircraft entering into the controlled area and also indicate the lateral position, with relation to a center line on the runway, of an aircraft that is airborne and about to land or in the process of leaving the airport in the adjacent air corridor.

Another object is to provide an indicating system responsive to aircraft on the ground and in the air for indicating remotely the position and direction of travel of aircraft along one or more runways and adjacent air corridors or along taxi strips.

A further object is to provide an improved system for automatically tracking aircraft proceeding along a predetermined path at an airport by detecting the passage of an aircraft by detectors spaced along such path and automatically setting up the direction of travel progressively on a remote display panel providing successive indications of the latest detection point passed by the aircraft and for automatically releasing such indications previously set up upon additional actuation of the next preceding detector along said path.

A further object is to provide for failure of any one detection station in an aircraft tracking system without loss of system continuity.

Another object is to provide a distinctive signal to the traffic director if a vehicle enters an approach zone, runway or taxiway at other than prescribed points.

Another object is to provide a distinctive signal to the traffic director if an aircraft or other vehicle fails to move at normal speed or stops on a runway or a portion of the taxiway where there is normally movement.

It is another object to provide an improved aircraft tracking system including apparatus to indicate when two aircraft that are proceeding in the same direction are traveling too close to one another.

A further object is to provide an aircraft tracking system or apparatus which establishes a preferential direction and indication by initial actuation plus actuation of the adjacent section by an aircraft itself and to give warning when an aircraft has entered upon and is traveling along the predetermined path in the direction counter to the preferred direction and on a collision course with the first aircraft.

Other objects will become apparent upon reference to the accompanying specification, claims and drawings in which:

FIG. 1 illustrates, in block form, a preferred embodiment of the present invention applied to a taxi strip or a runway, shown in plan view;

FIG. 2 illustrates, in plan view, a typical airport with detectors located along the sides of the runways and taxi strips projecting beams of radiant energy across the same and with additional detectors located off the ends of the runways, under the air corridors for detection of flying aircraft entering or leaving the airport;

Figure 4A:
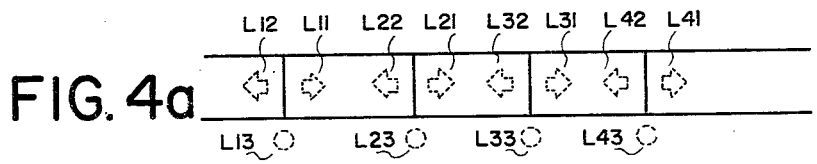
Figure 4B:
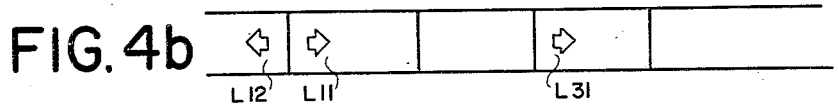
Figure 4C:
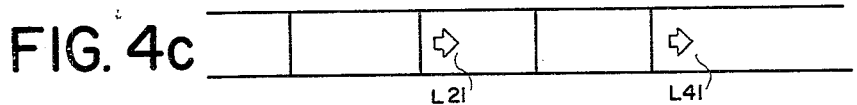
Figure 4D:
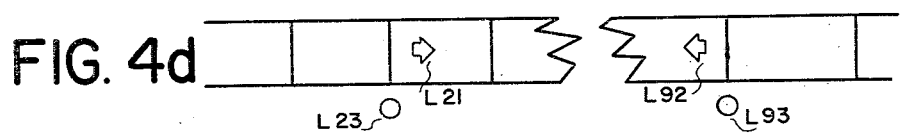
Figure 5:
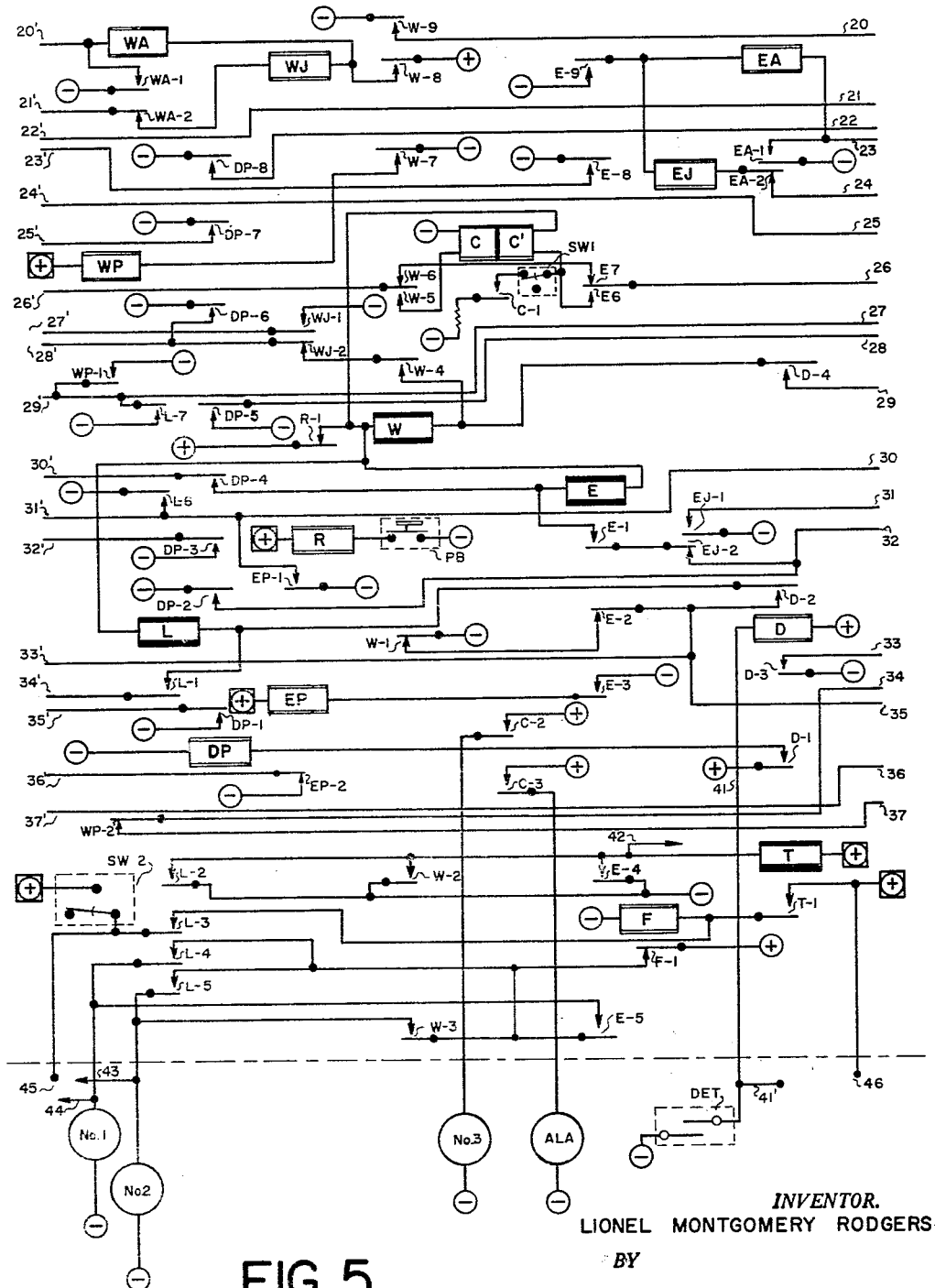
Figure 6:
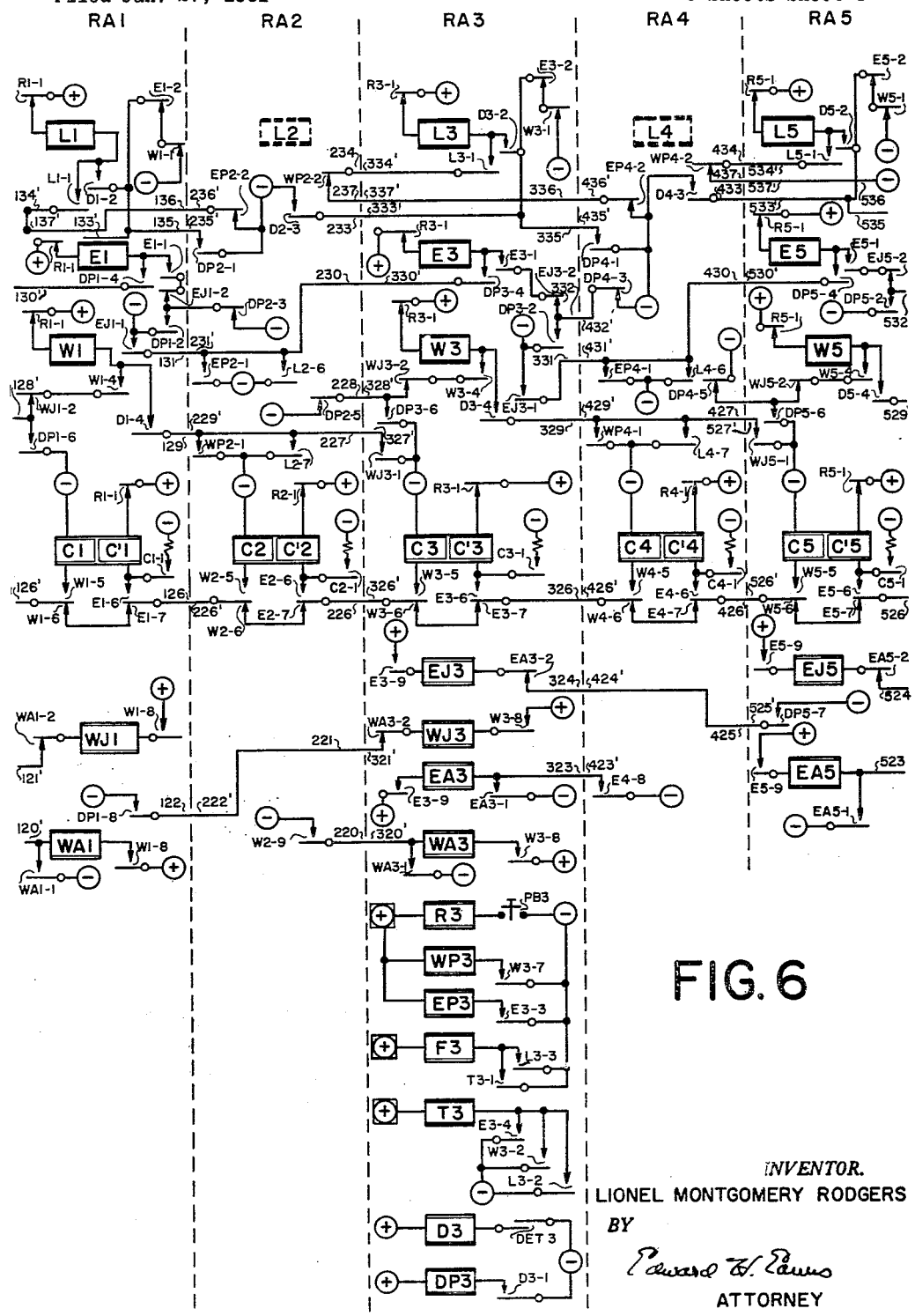
Figure 7:
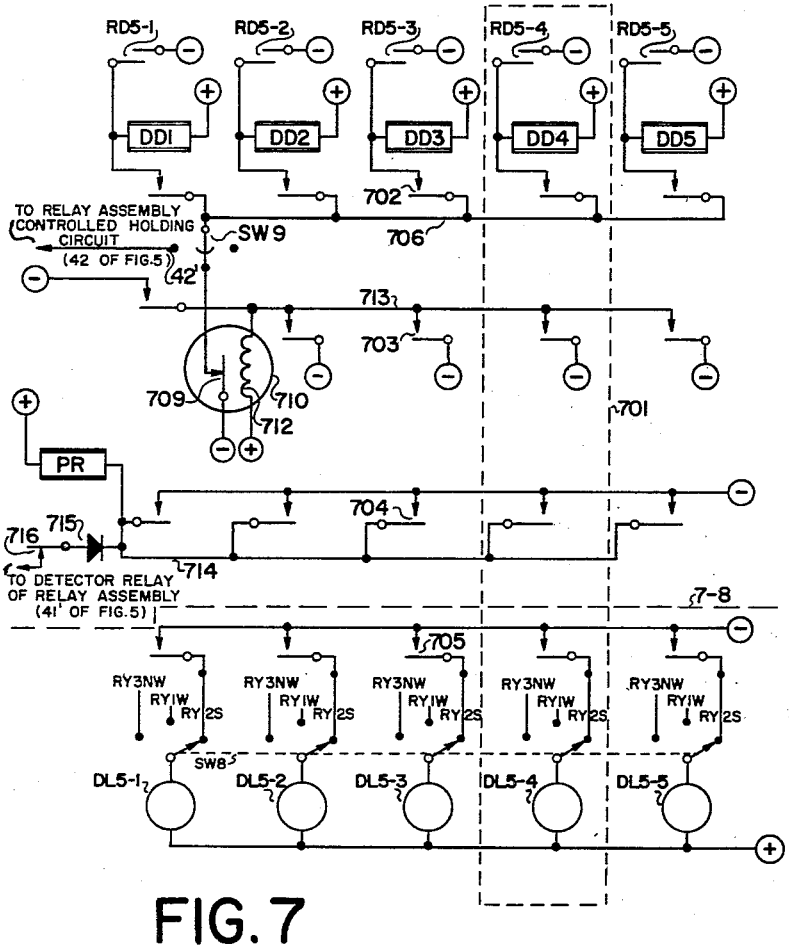
Figure 8:
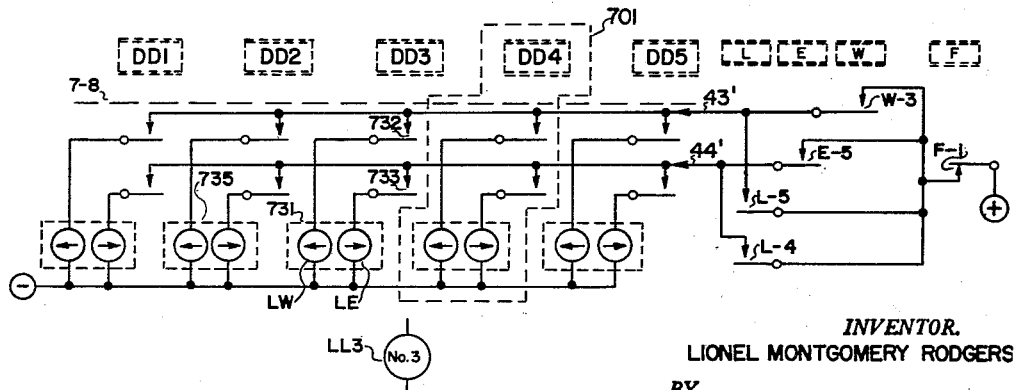

FIG. 4, including FIGS. 4a, 4b, 4c, and 4d, illustrates portions of a taxi strip or runway or air corridor on the miniature layout where FIG. 4a illustrates the contour of the several indicators associated with each detection station; FIG. 4b illustrates the indication of one detection station of two arrows illuminated in opposite directions indicating initial detecton of an aircraft and of another detection station of one arrow showing the direction and the approximate position of a second aircraft being tracked on the same runway or taxi strip; FIG. 4c illustrates that the non-directional detection indicator illustrated in FIG. 4b has been extinguished and a directional indicator of an adjacent detection station has been illuminated for the same aircraft; with the aircraft ahead proceeding into a new position from that illustrated in FIG. 4b, and FIG. 4d illustrates the indicators that are provided to indicate that two aircraft on the same taxi strip or runway are on a collision course;

FIG. 5 illustrates in schematic circuit form one complete detection station with a relay assembly, a detector device and output lamps and alarm;

FIG. 6 represents, in coded circuit form, the extension of the circuits of one relay assembly which may electrically terminate in the adjacent section or the next adjacent section and the circuit modification of the first relay assembly in the series and the circuit modification of the last relay assembly in the series;

FIG. 7 illustrates, in schematic circuit form one form of multi-detector detection station detector indicating apparatus in which the indicator lamps may be switched from one multi-detector detection station detector indicating apparatus to another like apparatus;

FIG. 8 illustrates, in schematic circuit form of circuitry that may be combined with certain of the circuitry of FIG. 7 to combine the functions of the detector indicating lamps and the detection and direction indicating lamps for multi-detector detection stations.

Referring to FIG. 1 in more detail, part of a runway or taxi strip, TX, is represented with four radiant energy detectors DET1, DET2, DET9 and DET10 represented on the side of the taxi strip, each detector projecting a confined beam of radiant energy across the taxi strip in a fan-like configuration. Each detector is connected to a relay assembly of the interconnected detection stations. The interconnected relay assemblies, RS are represented with relay assemblies RA1, RA2, RA9 and RA10 with the relay assemblies arranged in positions relative to each other as the location of their associated detectors, next to the taxi strip, TX. It should be understood that the space between DET2 and DET9 and between RA2 and RA9 and the panel below represents additional similar units.

Each relay assembly is illustrated with a group of output lines which are connected to a display panel DPL for providing output power to indicators which are located on a miniature layout of the taxi strip TXS with the indicators located in positions corresponding to the location of the detectors on the taxi strip. The indicators L11, L12 and L13 are controlled by relay assembly RA1, indicators L21, L22 and L23 by RA2, indicators L91, L92 and L93 by RA9 and L101, L102 and L103 by RA10.

The pushbuttons PB1, PB2, PB9 and PB10 represent the manual release pushbutton which are more fully illustrated in the circuit diagram in FIG. 5. An audible alarm, which may be associated with and operated by each relay assembly respectively, is not here illustrated although it may be associated with the display panel, Such audible alarm is illustrated in FIG. 5.

Figure 3:
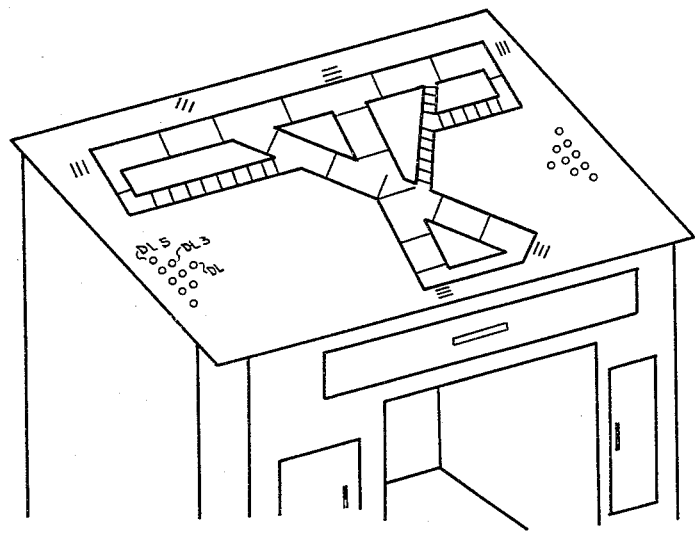
FIG. 3 illustrates, in perspective view, a desk or work table on the top of which is laid out a miniature of the airport represented in FIG. 2, with lines across the runways and taxi strips located in the approximate positions of, and corresponding to the detectors placed at the sides of the runways and taxi strips.

The display panel DPL may be in the form illustrated in FIG. 3 on a desk or table top or other convenient means of providing a layout.

FIG. 2 represents a layout of a typical airport with intersecting runways and a network of connecting taxi strips, a ramp for loading and unloading and a tower. The runways RY1, RY2 and RY3 are normally used for takeoff and landing operations, the runway to be used depending upon the prevailing wind. Along the side of each runway are spaced detectors represented by small circles with fan-like beams extending across the runway. Along the side of the taxi strips are also located additional detectors represented in similar fashion.

It will be noticed that the distance between adjacent detectors along the runways and the distance between adjacent detectors along the taxi strip is substantially different. This difference in distance between adjacent detectors on the runways and adjacent detectors on the taxi strips is determined by the anticipated speed at which the moving aircraft or vehicle may travel. On the runways a suggested distance between adjacent detectors may be 1000 feet although the distance between adjacent detectors need not be uniform. The suggested distance between adjacent detectors on taxi strips may be 250 feet although small or greater distances between adjacent detectors may be used in either case, as desired.

Off the ends of the runway, but substantially in a line perpendicular to a line through the center of the runway, are located additional detectors. These detectors are represented by a small solid line circle surrounded by a broken line circle, RDS, for example. These particular detectors are of the radiant energy type detector, the beam of which is projected vertically upward from the ground so that airborne aircraft pass through the vertically projected beam thus actuating the detector.

It will further be noticed that a single detector, for example RDS, at the bottom of runway RY2 is shown at the first off-runway detection station, but at the next detection station out from the end of the runway, three detectors RD3S, are employed, and at the detection station RD5S, the one farthest out, five detectors are spaced to cover a wide air path.

The triangular shaped configuration of detectors off the ends of the runway RY2, for example includes three individual detection stations while more or less than three detection stations off the ends of a runway may be used, if desired. The detection stations off the ends of runway RY3 are illustrated with single detectors for convenience.

As an aircraft is about to land, for example on runway RY2, such aircraft may be exactly lined up with the center line of the runway so that such craft will substantially pass over the centrally located detector in the grouped detectors of each detection station. Passage of such aircraft over each detection station will result in, actuation of the detection station itself through actuation of one or more of the particular detectors of the grouped detectors of the detection station and actuation of the multi-detector detection station detector indicating and detection unit which may result in indicating the lateral position of the aircraft with respect to a center line approach to the runway.

Although the grouped detector detection stations are not fully illustrated as being off the ends of all three of the runways, it is obvious that such grouped detector detection stations may be employed off the end of any one runway, or all runways as desired. Compass directions are illustrated for convenience of illustration.

FIG. 3 illustrates one form of display panel which may be used in the present invention to provide indication of operations on a miniature layout of the airport and adjacent air corridors. The top of a desk, table or cabinet may be used to hold the miniature layout, which desk, table or cabinet may be conveniently adjacent to a work table or other fixture. The lines across the miniature runways and taxiways each represent positions of a detector of a detection station correspondingly located on the side of the actual runway and taxi strip (as in FIG. 2). The line off the ends of the runway represent corresponding positions of detection stations located off the end of the runways.

The triangular configurations on the lower left corner of the desk top and in the lower right corner represent indicator lamps for indicating which one of the grouped detectors of each detection station off the end of the runway was actuated as the aircraft was approaching the runway to land or was in the process of climbing away from the field. This may indicate the lateral approach of an aircraft to the runway itself.

FIG. 4a illustrates a portion of the miniature layout with the sets of three indicators (two arrows facing in opposite directions, and a circular indicator) at each detection station, shown in broken line form. It is assumed these indicators are not illuminated.

FIG. 4b illustrates a portion of the miniature layout with both arrows L11 and L12 of one detection station illuminated which indication represents detection of a vehicle without any indication of the direction of travel of such vehicle while the single illuminated arrow L31 of the detection station to the right in FIG. 4b indicates that another vehicle or aircraft is in the taxiway and has actuated the detector associated with the detection station of which lamp L31 is a part and is traveling in the direction of the arrow of indicator lamp L31 along the runway or taxi strip.

FIG. 4c illustrates that the vehicle or aircraft in FIG. 4b that had been detected and was indicated without a direction (L12 and L11) has actuated an adjacent detector of an adjacent detection station and the direction of travel of such vehicle has now been determined and is so indicated by indicator lamp L21 while the vehicle ahead on the taxiway or to the right, has actuated a subsequent detector and is being tracked as by indicator L41 as it progresses along the runway or taxi strip.

FIG. 4d illustrates the indication provided when two vehicles are traveling on the same runway or taxi strip in opposite directions and are on a head-on or collision course. The directional indicators L21 and L92 are illuminated to indicate direction of travel and in addition the circular indicator L23 and L93 are illuminated, thus providing an unique combination of signal indication which may be accompanied by an audible alarm, at each position if desired.

It should be noted that according to the preferred embodiment the non-directional detection indication as shown in for example FIG. 4b by the illumination of L12 and L11 of the same detection station, is shown whenever a vehicle enters upon the controlled path. If the vehicle enters into the controlled path through the first detection station in the series, the non-directional indication is illuminated with steady indicator lamps. If the vehicle enters into the controlled path at any point other than a normal entry station, the preferred embodiment provides a flashing non-directional signal.

The indicators and indications shown here are, of course, illustrative.

Other types or combinations of indicators or indications may be used by merely connecting the output of the respective relay assemblies in different fashion and to different indicating devices as will be obvious to those skilled in the art using the various known types of indicators.

Referring now to FIG. 5, a circuit diagram of the preferred detection station is illustrated with the relay assembly above the broken horizontal line in which the relays are illustrated deenergized and the contacts in their normally deenergized condition. This condition would be the normal rest condition of a relay assembly while awaiting a detection pulse from its associated detector, located below the broken horizontal line.

The detector, normally associated with the relay assembly is represented by a set of open contacts DET surrounded by a broken line box in the lower right of the drawing.

The indicator lamps are represented by open circles labeled No. 1, No. 2 and No. 3 with open circle ALA representing an audible alarm, all below the broken horizontal line.

The relay assembly would be duplicated so that each detection station would include an identical relay assembly. The connections between adjacent relay assemblies would likewise be identical, such that the leads of, for example the second relay assembly in a series would connect with the third relay assembly in the series so that the leads 20 through 37 on the right hand side of the second relay assembly would connect with leads 20' through 37' on the left hand side of the third relay assembly and the leads 20 through 37 of the third relay assembly would connection with leads 20' through 37' of the fourth relay assembly, and so forth throughout the series.

There are two departures from the uniform interconnections between relay assemblies with the departures occuring at the terminating ends of the series. Approaching the series of relay assemblies from left to right, the first relay assembly of the series has its left hand side terminals 20' through 37' which would be open except for a jumper connection between terminals 34' and 37'. The terminals on the right hand side of the first relay assembly 20 through 37 are connected to the terminals in the left hand side of the second relay assembly 20' through 37' respectively.

The second departure from the uniform interconnection occurs at the terminals of the last relay assembly in the series at its right hand end terminals. As to the right hand end of the final relay assembly terminals 20 through 37 will be left open except for terminal 36 which will be connected to a common ground, represented by a minus in a circle.

Thus the several relay assemblies of the series of detection stations may be interconnected so as to provide an interlinking system of identical relay assembly circuits.

Of course each relay assembly circuit will have its associated detector and its individual outputs for operating, holding and releasing the individual indicators and alarms.

The associated detector DET would be positioned so that an aircraft or other vehicle passing through its beam would actuate the detector which would cause closure of a set of contacts thus completing a circuit to energize the detector relay D from a positive direct current supply, represented by a plus in a circle through the coil of relay D, lead 41, the contacts of detector DET, to a common ground represented by a minus in a circle.

Detector relay D substantially initiates the relay assembly circuit into action upon energization and depending upon the condition of the adjacent relay assembly or assemblies, or the next adjacent relay assemblies. The described relay assembly will respond and provide certain output for operation of certain indicators.

The relay D controls contacts D–1, D–2, D–3 and D–4, which are normally open contacts, with contact D–1 completing the energizing circuit for the detector repeater relay DP. Relay DP controls contacts DP–1, DP–2, DP–3, DP–4, DP–5, DP–6, DP–7 and DP–8 which are all normally open contacts.

Relay R is a release relay which controls one normally closed contact R–1, through which contact a direct current power source flows for the non-directional relay L and the two directional relays, relay E and relay W. The collision indicator relay C–C' which is a double coil relay also is supplied with power through contact R1. The relay L is a delayed pull-in and delayed drop-out relay while relays E and W are both delayed drop out relays.

Relay L controls contacts L–1, L–2, L–3, L–4, L–5, L–6 and L–7 all of which are normally open contacts. Relay E controls contacts E–1, E–3, E–4, E–5, E–6, E–8 and E–9 all of which are normally open contacts and E–2 and E–7 which are normally closed contacts. Relay W controls contacts W–2, W–3, W–4, W–5, W–7, W–8 and W–9 all of which are normally open contacts and W–1 and W–6 which are normally closed contacts. Relay C–C' controls normally open contacts C–1, C–2 and C–3.

Relay WP is a repeater relay of relay W and relay EP is a repeater relay of relay E. Relay WP controls normally open contact WP–1 and normally closed contact WP–2. Relay EP controls normally closed contact EP–2 and normally open contact EP–1. The relay WA controls normally open contact WA–1 and normally closed contact WA–2 while relay EA controls normally open contact EA–1 and normally closed contact EA–2. The relay WJ controls normally open contact WJ–1 and normally closed contact WJ–2 while relay EJ controls normally open contact EJ–1 and normally closed contact EJ–2.

Relay T is a time delay relay which upon energization begins to time a period before the relay actually pulls in. Upon pull-in, which may be adjusted as desired up to 10 seconds, for example, the relay T closes normally open contact T–1. The relay F serves as a flasher for certain of the signal indicators. The relay itself may be a self interrupting relay or may have, in its circuit, a flasher, which is well known in the art. Relay F controls normally closed contact F–1.

Relay R is energized and pulled in by completion of the energizing circuit, normally held open, when push-button PB is manually operated to complete the circuit.

The switch SW1 provides for selection between alternate modes of operation of the collision alarm ALA and indicator lamp No. 3 which are controlled by collision relay C–C'. With switch SW1 as illustrated the holding contact C–1 is connected to maintain the collision relay energized as more fully described below.

Switch SW2, illustrated open provides, when closed, a circuit to energize flasher relay F when the relay L is energized and pulled in. This, as explained below serves to provide a flashing non-directional indication. Switch SW2 may be eliminated and an alternate method of flasher operation may be provided by jumper connecting the terminals 45 and 46.

Referring now to FIG. 6 a circuit diagram which represents a series of five successively spaced relay assemblies is presented with relay assembly RA1, the first in the series, and RA5, the last in the series. The relay assembly RA3 is the only relay assembly completely illustrated, although the outputs for operation of the indicators and alarms are omitted.

Through a system of coding it will be seen that the relays of FIG. 5 (the completely illustrated relay assembly circuit of one detection station) appear in relay assembly RA3 in FIG. 6 with similar relays lettered with similar letters plus the number of position of the relay assembly in the series. As for example in FIG. 5 relays L, E, W etc. are shown, where in FIG. 6 corresponding relays in relay assembly RA3 are numbered L3, E3, W3, etc. In relay assembly RA1 similar relays would be labeled L1, E1 and W1, etc.

Each contact in FIG. 6 is coded so that the letter of the controlling relay appears with a dash followed by a number of the contact which corresponds to a corresponding contact in FIG. 5, as for example, in FIG. 5 the contacts controlled by relay L are numbered L–1, L–2, L–3, etc. while in FIG. 6 corresponding contacts controlled by relay L3 of RA3 are numbered L3–1, L3–2, L3–3, etc.

In FIG. 6 for convenience of illustration it is assumed that the contacts are all controlled from a relay positioned above the contact and all relays are represented to be deenergized.

It will be noted that certain relay control circuits extend into adjacent relay assemblies and some relay control circuits extended into the next two adjacent relay assemblies. Other relay control circuits are incomplete because of the absence of adjacent relay assemblies.

Referring to the relay assembly RA3, which is an example of a typical relay assembly, the normal pull in circuit for non-directional relay L3 upon a vehicle entry at the boundary detector associated with relay assembly RA3 may be followed from the direct current positive power source, represented by a plus in a circle, through normally closed contact R3–1 of relay R3, through the coil of relay L3, through contact D3–2, of relay D3, which closed on actuation of the detector associated with RA3, through normally closed contact E3–2, of relay E3, through normally closed contact W3–1, of relay W3, to common ground. Another closure path for the L3 relay is from contact D3–2, lead 333' to relay assembly RA2, lead 233, contact D2–3 of relay D2 if closed, to ground or alternatively from contact D3–2, lead 335 to relay assembly RA4, lead 435', contact DP4–1 if closed, of relay DP–4, to ground.

The holding circuit for relay L3 follows from the power supply through contact R3–1, the coil of relay L3, contact L3–1, lead 334' to RA2, lead 234, contact WP2–2 of relay WP2, lead 237 to RA3, lead 337' to lead 336 to RA4, lead 436' contact EP4–2 of relay EP4 to ground.

The relay L1 in relay assembly RA1 has a somewhat modified holding circuit because of the absence of a relay assembly to the left of RA1. This modified hold circuit for relay L1 includes the elimination of a relay contact of the WP series which would be in the relay assembly to the left, by jumpering the leads 134' and 137'. Further, the pull-in circuit for L1 which would include the detector relay contact of the relay assembly to the left of RA1 has been modified so as to omit circuitry beyond lead 133'.

The relay L5 of relay assembly RA5 has a somewhat modified pull-in circuit because of the absence of a relay assembly to the right of RA5. The relay contacts of the EP series relay to the right of RA5 have been eliminated and the lead 535 of RA5, which would connect to contact DP6–1 is open.

The holding circuit of relay L5 in relay assembly RA5 is also modified, i.e., the holding circuit of L5 is completed to ground through a terminal 536 instead of the next EP6–2 relay contact as would be the case if RA5 were not a terminating section.

Each relay assembly of each detection station includes a relay of the D series which relay is energized and pulled-in upon closure of the associated DET contacts by actuation of the detector. Upon pull-in of relay D the relay DP, a repeater relay of relay D is also energized and pulled-in. Contacts controlled by the D relay or the DP relay provide completion of circuitry to energize and pull-in one relay, either relay L or relay E or relay W, depending upon previous history of travel and actuation by the actuating vehicle in the system.

It should be understood that repeater relays are provided to prevent excessively high relay pile up on any one relay. If there were no objection to a high pile up then the contacts of any one repeater relay could be added to the contacts of the relay which controls the respective repeater relay and thus eliminate the repeater relay.

If, for example, there is no previous history by the actuating vehicle regardless where, in the series of detection stations the vehicle enters the system, pull-in of the D series relay and of the repeater relay of the DP series of the same relay assembly by actuation of the associated detector of the detection station will cause energization and pull-in of the associated L series relay. If the vehicle has left a history, as for example, has caused operation of at least one or more prior consecutive detection stations, then, depending on the direction of travel, closure of the contacts of the D series relay or the DP series relay, in cooperation with relay contacts of the last previously operated relay assembly, will energize either the E series relay of the current operated relay assembly (with vehicle traveling from left to right) or the W series relay of the current operated relay assembly (with the vehicle traveling from right to left). The closing of certain of the contacts of the D relay closes an energizing circuit for the associated L series relay, but because of the slow pull-in characteristics of the L relays the relay will not pull-in before pull-in of either the E series relay or the W series relay, both of which may break the energizing circuit of the associated L series relay.

In the preferred embodiment the relay of the L series of each relay assembly is a delayed pull-in and delayed drop out relay with the delay on pull-in of the order of .25 second, for example, and the delay on drop-out of the order of 2 seconds, for example. The relays of the E series and of the W series, in the preferred embodiment are rapid pull-in and delayed drop-out relays, with the delayed drop-out of the order of 2 seconds, for example.

The particular characteristics of the L series, the E series and the W series relays are provided so that although energized, the relay of the L series will only pull-in in the event that neither relay E nor relay W pull in. Pull-in of the relay E and pull-in of the relay W depend on the history of the actuating vehicle in the system and pull-in of the relay L depends upon neither relay E nor relay W pulling in.

Accordingly, in order to pull in relay L3 of relay assembly RA3, relay D3 must be pulled-in to close its contact D3–2 and both relays E3 and W3 remain deenergized.

As will be seen below, the directional relays of the

E series and of the W series of a relay assembly will be energized and pulled in, in the second of two successive relay assemblies upon actuation of two adjacent relay assemblies successively or in the third of three successive relay assemblies upon actuation of the first relay assembly and skipping of the second relay assembly of the series and actuation of the third if the first of the three relay assemblies had already pulled in one of the directional relays. Depending upon the direction of travel from the initially operated relay assembly to the adjacent, and subsequently operated relay assembly, the relay of the E series or the W series of the second successively operated relay assembly will become energized and pull-in.

The directional relay E3 of RA3, which may respond to a vehicle that is traveling eastbound, for example may be energized via a circuit from the power supply through contact R3–1, the coil of relay E3, contact DP3–4, lead 330' to relay assembly RA2, lead 230, contact L2–6 to ground or from lead 230 via contact EP2–1 to ground or from lead 230, lead 231' to relay assembly RA1, lead 131, contact EJ1–1 of relay EJ1 to ground. Upon pull-in of relay E3 relay EP3 becomes energized via closure of contact E3–3 and pulls-in.

The holding circuit for relay E3 may be traced from positive power through contact R3–1, the coil of relay E3, contact E3–1, contact EJ3–2, contact DP3–2 to ground or from contact EJ3–2 lead 332 to relay assembly RA4, lead 432' to contact DP4–3 to ground. Thus in order to energize the relay E3 the relay L2 of RA must be pulled-in or relay EP2 of RA2 (relay EP2 is a repeater relay of E2 of RA2, therefore relay E2 of RA2 must be pulled-in to energize EP2) must be pulled-in or relay EJ1 of RA1 must be pulled-in (the relays of the EJ series are skip relays that are energized when an E series relay of one relay assembly is pulled-in but the adjacent relay assembly to the right is either missed or fails to respond to actuation and the next to adjacent relay assembly to the right responds to actuations).

Thus, an aircraft or other vehicle traveling from, for example, left to right through the system will, under normal conditions, actuate the initial detector relay, of the D series, and cause the L series relay of the initial relay assembly of the initial detection station (relay L1 of RA1) to become energized and pull-in, and, upon the vehicle continuing normally along the pre-determined controlled path, will actuate the adjacent detector of the detection station to the right and cause the E relay of the adjacent detection station (relay E2 of RA2) to become energized and pull-in and cause the L relay of the previous detection station (relay L1 of RA1) to become de-energized and drop-out. As each subsequent detector in the series of detection stations is actuated, its associated relay of the E series will become energized and pull-in and the relay of the E series of the adjacent detection station to the left the detection station just previously operated) will be deenergized and dropped-out.

The E series relay (E1) of the initial detection station in the system (RA1) will remain deenergized because its energizing circuit is open at lead 130', further, since RA1 is the initial detection station in the system of a left to right series, the system could have no history of the actuating vehicle and therefore the relay of the L series (L1) would become energized and pull-in in response to a vehicle first entering the system at RA1.

The E series relay (E5) of the final detection station in the system (RA5) will become deenergized and drop out upon deenergization of the associated D series relay and DP series relay since the holding circuit which normally has a parallel connection to ground through another relay assembly (RA6, not shown) to the right, via lead 532, is open.

The directional relay W3 of RA3, which may respond to a vehicle that is traveling westbound, for example may be energized via a circuit from the power supply through contact R3–1, the coil of relay W3, contact D3–4, lead 329 to relay assembly RA4, lead 429', contact WP4–1 to ground or from lead 429' contact L4–7 to ground or from lead 429', lead 427 to relay assembly RA5, lead 527', contact WJ5–1 to ground. Upon pull-in of relay W3, relay WP3 becomes energized via closure of contact W3–7.

The holding circuit for relay W3 may be traced from positive power through contact R3–1, the coil of relay W3, contact W3–4, contact WJ3–2, contact DP3–6 to ground or from contact WJ3–2, lead 328' to relay assembly RA2, lead 228, contact DP2–5 to ground.

Thus in order to energize the relay W3 the relay L4 of RA4 must be pulled-in or relay WP4 of RA4 (relay WP4 is a repeater relay of W4 of RA4, therefore relay W4 must be pulled-in to energize WP4) must be pulled-in or relay WJ5 of RA5 must be pulled-in (the relay of the WJ series being a skip relay that is energized when the W series relay of one relay assembly is pulled-in but the adjacent relay assembly to the left is either missed or fails to respond to actuation and the next to adjacent relay assembly to the left responds to actuation).

Accordingly a vehicle traveling from, for example, right to left through the systems will, under normal conditions actuate the initial detector relay of the D series and cause the L series relay of the initial relay assembly of the initial detection station (relay L5 of RA5) to become energized and pull-in and, upon the vehicle containing normally along the predetermined controlled path, will actuate the adjacent detector of the detection station to the left and cause the W relay of the adjacent detection station (relay W4 of RA4) to become energized and pull-in and cause the L relay of the previous detection station (relay L5 of RA5) to become deenergized and drop-out. As each subsequent detector in the series of detection stations is actuated, its associated relay of the W series will become energized and pull-in and the relay of the W series of the adjacent detection station to the right (the detection station just previously operated) will be deenergized and drop-out.

The W series relay (W5) of the initial detection station in the system (RA5), will remain deenergized because its energizing circuit is open at lead 529, further since RA5 is the initial detection station in the system of a right to left series, the system could have no history of the actuating vehicle and therefore the relay of the L series (L5) would become energized and pull-in in response to a vehicle first entering the system at RA5.

The W series relay (W1) of the final detection station in the system (RA1) will become deenergized and drop-out upon deenergization of the associated D series relay and DP series relay since the holding circuit which normally has a paralled connection to ground through another relay assembly to the left (RA0, not shown), via lead 128', is open.

Referring back to FIG. 5 it will be observed that the series L relay controls, among others, contacts L4 and L5 which, in series with a normally closed contact F–1 of the relay of the F series, close to illuminate the indicator lamps No. 1 and No. 2 respectively. Indicator lamp No. 1 has a parallel illuminating circuit through the series E relay contact E–5 and indicator lamp No. 2 has a parallel illuminating circuit through the series W relay contacts W–3.

Thus when the series L relay of any relay assembly of a detection station becomes energized and pulls-in, both series indicator lamps No. 1 and No. 2 of that detection station will become illuminated. Referring to FIG. 1 and FIG. 4, the indicator lamps L11, L21, L91 and L101 are individually comparable to indicator lamp No. 1 in FIG. 5, in their respective detection station while indicator lamps L12, L22, L92 and L102 are individually comparable to indicator lamp No. 2, in FIG. 5, in their respective detection station.

Accordingly, energization and pull-in of the L series relay will provide illumination of the lamps No. 1 series and No. 2 series and, in the preferred form with both indicator lamps, in the shape of arrows, this indication may mean detection of a vehicle or aircraft but no direction of mean of travel of such actuating vehicle has been established. On the other hand energization and pull-in of the E series relay will provide illumination of the lamp No. 1 series to indicate the vehicle has actuated the associated detector and that it has been established that the actuating vehicle is traveling in the direction of the illuminated arrow, or eastbound for example, while illumination of the lamp No. 2 series by energization and pull-in of the W relay series may indicate the vehicle has actuated the associated detector and that it has been established that the actuating vehicle or aircraft is traveling in the direction of the illuminated arrow, or westbound, for example.

Each of the indications, whether of a non-directional nature or of a directional nature indicates the approximate position of the actuating vehicle, relative to the detector associated with the detection station which has illuminated its indicator.

Referring again to FIG. 6, the EA series relay is energized through the cooperation of the E series relay of the associated relay assembly and the E series relay of the adjacent relay assembly, to the right so that, for example, relay EA3 of RA3 will become energized upon pull-in of relay E3 of RA3 plus pull-in of relay E4 of RA4. The circuit may be traced from a source of power, through contact E3–9, the coil of relay EA3, lead 323 to relay assembly RA4, lead 423', contact E4–8 to ground. Relay EA3 has a holding circuit through its contact EA3–1 to ground. The relay of the EA series therefore, by cooperation of two adjacent relay assemblies may indicate that the relay assembly of which it is a part has responded to an eastbound vehicle and the adjacent relay assembly to the right has also responded to a preceding actuating vehicle.

The relay of the EJ series operates in coordination with operation of the associated relay of the E series and the associated relay of the EA series and operation of the relay of the DP series in the next-to-adjacent relay assembly to the right.

The energizing circuit for relay EJ3 may be traced from a source of power through contact E3–9, the coil of relay EJ3, contact EA–2, lead 324 to RA4, lead 424', lead 425 to RA5, lead 525', contact DP5–7 to ground.

Thus, for example, if E3 becomes energized and pulls-in through actuation and the actuating vehicle continues to the adjacent detection station to the right and such detection station (relay assembly RA4) fails to respond to actuation, relay E4 of RA4 will not become energized. Thus relay EA3 will not pull-in since contact E4–8 will remain open and with relay EA3 out contact EA3–2 will remain closed. Assuming the actuating vehicle continues on to and actuates the detector of the next adjacent detection (relay assembly RA5) and relays D5 and DP5 become energized, the contact DP5–7 will close and complete the energizing circuit for relay EJ3 of RA3. This is an indication that the detection station of which RA4 is a part, failed to respond to actuation and the next detection station, of which RA5 is a part has responded to actuation of the same vehicle.

Certain contacts of relay EJ3 in RA3 control one of the parallel pull-in circuits for the relay E5 in RA5 so that the relay E5 may become energized and maintain the tracking of the traveling vehicle in the event that one detection station, RA4, for example between RA3 and RA5 fails to operate in response to an eastbound vehicle.

Further, if, after detection of a vehicle through actuation by the same has been made, a detection station fails to respond to actuation, or the vehicle stops on the predetermined path without actuating the next detection station or the vehicle leaves the predetermined path without actuating either the last detection station or any further interim detection station in the system, the non-directional relay of the L series, or the directional relay of the E series or the W series of the last actuated detection station will remain energized since the respective holding circuit of the energized relay will remain unbroken.

In such event a time delay relay of the T series is provided in each relay assembly with three parallel energizing circuits. The circuit of the time delay relay is closed by energization of either the associated L series relay, E series relay or the W series relay; however, the time delay relay is adjusted so as to pull in only after a desired period of time, as for example ten seconds. If the relay closing the energizing circuit of the time delay relay remains pulled-in for a time exceeding the delay period the time delay relay will pull-in.

For example, the time delay relay T3 of RA3 may be energized via a circuit from a source of alternating current power, represented by a plus in a circle in a square, through the coil of relay T3 and through contact E3–4 to common ground or through contact W3–2 to ground or through contact L3–2 to ground.

If the non-directional relay or directional relay then energized and pulled-in remains pulled-in for a period in excess of the delay period so that the time delay relay pulls in, the associated time delay relay of the T series will close its contact T–1 (re FIG. 5) to complete an energizing circuit for a flashed relay of the F series, which may be a self-interrupting relay, and during its energization the relay of the F series periodically may open and then close its contact F–1 (FIG. 5). The contact F–1 is in the circuit for the indicator lamps No. 1 and No. 2 and the lamps No. 1 and/or No. 2 will flash on and off.

The flasher relay of the F series also has a parallel energizing circuit through contact L–3, and through switch SW2, or alternatively through jumpered terminals 45 and 46 (FIG. 5), as previously described.

If two or more consecutive detection stations fail to respond to actuation the chain reaction will be broken and the next actuated detection station in the series that responds to actuation of the traveling vehicle will provide a non-directional detection indication, as if entrance had just been made into the system. If this should occur an observer may deduce that either the vehicle being tracked has followed some erratic course or the detection stations that failed to respond are malfunctioning. The indicator lamp of the last actuated station will flash to call attention to this variation from normal indication.

It will be noticed that the energizing circuit of relay EA5 is incomplete since its energizing circuit is open at lead 523. It will further be noticed that the energizing circuit of relay EJ5 is incomplete since its energizing circuit is open at lead 524. Further the energizing circuit for relay EJ4 (not shown) will also be incomplete since its energizing circuit will also be open at lead 525. Thus although the terminating detection station, RA5, in the left to right direction may be "skipped" the relay WJ4 will not pull-in because of a structurally incomplete energizing circuit.

In the event that either the relay of the L series or the relay of the E series or the relay of the W series should fail to become deenergized or to be held in because of abnormal operation, a push-button PB (FIG. 5) is provided to manually close an energizing circuit for the associated relay of the R series. When energized, the relay R will open its contact R–1 (FIG. 5) which contact is common to the energizing and holding circuits of the relays L, E, W and C–C' of the same detection station so that the relays L, E, W and C–C' may be manually deenergized so that a relay that may be held in may be dropped-out and returned to rest and, with the release of the pushbutton PB, the relay of the R series will drop out and thus the relay assembly will return to a rest condition.

Referring again to FIG. 6, the WA series relay is energized through cooperation of the W series relay of the associated relay assembly and the W series relay of the adjacent relay assembly, to the left. Thus, for example, relay WA3, of RA3, will become energized upon energization of relay W3 of RA3 plus energization of relay W2 of RA2. The circuit may be traced from a source of power through contact W3-8, the coil of relay WA3, lead 320', to RA2, lead 220, contact W2-9 to ground. Relay WA3 also has a holding circuit through its contact WA3-1 to ground. The relay of the WA series therefore, by cooperation of two adjacent relay assemblies indicates that the relay assembly of which it is a part has responded to actuation of a westbound vehicle and the adjacent relay assembly to the left has responded to actuation of a preceding westbound vehicle.

The relay of the WJ series operates in cooperation with the associated relay of the W series and the associated relay of the WA series and the relay of the DP series in the next to adjacent relay assembly to the left.

The energizing circuit for the relay WJ3 may be traced from a power supply through contact W3-8, the coil of relay WJ3, contact WA3-2, lead 321' to RA2, lead 221, lead 222' to RA1, lead 122 to contact DP1-8 to ground.

Thus for example, if W3 of RA3 becomes energized and pulls-in through actuation and the actuating vehicle continues to the adjacent detection station to the left and such detection station (relay assembly RA2) fails to respond to actuation, relay W2 of RA2 will not become energized. Thus relay WA3 will not pull-in since contact W2-9 will remain open and with relay WA3 out, its contact WA3-2 will remain closed. Assuming the actuating vehicle continues on and actuates the detector of the next to adjacent detection station (relay assembly RA1) and the relays D1 and DP1 become energized and pull-in, the contact DP1-8 will close and complete the energizing circuit for relay WJ3 of RA3. This is an indication that the detection station of which RA2 is a part, failed to respond to actuation and the next detection station, of which RA1 is a part has responded to actuation by the same vehicle.

Certain contacts of relay WJ3 in RA3 control one of the parallel pull in circuits for the relay W1 in RA1 so that the relay W1 may become energized and pull-in and maintain the tracking of the traveling vehicle from right to left in the event that one detection station, RA2, for example, between RA3 and RA1 fails to operate.

It will be noticed that the energizing circuit of relay WA1 is incomplete since its energizing circuit is open at lead 120'. It will further be noticed that the energizing circuit of relay WJ1 is incomplete since its energizing circuit is open at lead 121'. Further the energizing circuit for relay WJ2 (not shown) will also be incomplete since its energizing circuit is also open at lead 122'. Thus although the terminating detection station, RA1, in the right to left direction may be "skipped" the relay WJ2 will not pull-in because of a structurally incomplete energizing circuit.

In the event that one detection station in the system fails to operate or is "skipped" the last energized relay of the W series of the E series of the detection station last responding to actuation will remain energized and, as previously described, the associated energized time delay relay of the T series will, after the delay period, pull in to close a circuit to energize the associated self-interrupting relay of the F series so as to cause the indicator lamp of the last illuminated indicator, before the "skipped" detection station, to flash.

Release of the held relay of the W series or the E series may be accomplished manually through closure of the associated relay of the R series by pushing the associated push button PB. Referring to relay assembly RA3, when pushbutton PB3 is closed relay R3 is energized and pulled-in. Relay R3 opens its contact R3-1 and opens any energizing or holding circuit of relay L3, E3, W3 or C3-C3' that may have been completed.

It will be noticed that each relay of the E series controls contacts in the energizing circuit of the C' relay of the associated double coil relay C-C' and that each relay of the W series controls contacts in the energizing circuit of the C relay of the associated double coil relay C-C'. The coil C of C-C' is connected to the common ground return and the coil C' is connected to a direct current positive supply through a contact of the associated relay of the R series. The interconnecting network of circuits and contacts of the C-C' relays are so arranged so that when a relay of the E series, as for example E2, pulls-in and closes the contact E2-6 and a relay of the W series, to the right in the system, as for example W4, pulls-in and closes the contact W4-5 a circuit is completed to energize double coil relay C2-C'2 and C4-C'4 from positive power through contact R2-1, the coil C'2, contact E2-6, lead 226, to RA3, lead 326', contact W3-6, contact E3-7, lead 326, to RA4, lead 426', contact W4-5, coil C4 to ground. Both relays C2-C'2 and C4-C'4 will become energized and, assuming the switches SW1-2 and SW1-4, not shown, (switch SW1 in FIG. 5) are closed, relay C2-C'2 will close its contact C2-1 and contacts C2-2 and C2-3, the latter two contacts shown in FIG. 5, and relay C4-C'4 will close its contacts C4-1, C4-2 and C4-3. Closure of contacts C2-1 and C4-1 will complete holding circuits for relays C2-C'2 and C4-C'4 respectively.

The manner in which the network of contacts and circuitry of the C-C' series relays are connected provides for operation of at least two relays of the C-C' series at one time. In the event that two vehicles enter upon the same controlled path, each traveling in different directions and are on a collision course and the direction of travel of each vehicle is determined, an E series relay on the left end of the system and a W series relay on the right end of the system will become energized and pull-in. This combination will provide completion of circuitry to energize and pull-in the C-C' relay associated with the energized and pulled-in relay of the E series and also energize and pull-in the C-C' relay associated with the energized and pulled-in relay of the W series.

Referring to FIG. 5 it will be seen that the relay C-C' controls contacts C-1, C-2 and C-3. Contact C-1 is a holding contact which, when closed, completes a holding circuit for coil C' through a resistor to ground. The impedance in this resistor may be substantially equal to the impedance in the coil C so that as the vehicles progress toward each other and subsequent detection stations track the progress of each vehicle respectively, by responding to actuation, closure of, for example, contact W3-5 will open the energizing circuit of the relays C2-C'2 and C4-C'4 but each relay will be held-in via its respective holding contact C2-1 and C4-1 and the total impedance in the holding circuit will be substantially equal to the total impedance in the pull-in circuit.

Thus, with the switch SW1 of all relay assemblies closed, the collision indication of each detection station that has responded to the collision course of travel will be held operated, until released by operation of each respective pushbutton PB, which will operate the respective relay of the R series to reset the relay assembly.

Alternately, with switch SW1 open, the holding circuit of the C-C' relay will not be completed and only the C-C' relays of the then responding detection station will be operated to operate its associated collision alarm.

As with the tracking in the eastbound direction, if two or more consecutive detection stations fail to respond to actuation of a westbound vehicle, the chain reaction of the interconnected relay assemblies will be broken and the next actuated detection station in the series that responds to actuation of the traveling vehicle will provide a non-directional detection indication.

Referring now to FIG. 7 the multi-detector detection station detector indicating device is represented in circuit form. This detector indicating device includes circuitry for indicating which one of five detectors of a five detector detection station has been actuated by a flying aircraft and also provides a pulse to the detector relay of the relay assembly of the detection station upon actuation of one or more of the detectors.

Although a five unit indicating device is illustrated obvious an indicating device including more than five units or less than five units may be made by, for example, adding one or more units such as that enclosed in the broken line box 701 or eliminating one or more such units and closing the circuit accordingly.

It should be understood that the multi-detector detection station detector indicating apparatus may be employed to indicate which one or more detectors of a multi-detector detection station are actuated by a flying aircraft. This last indication may be in addition to the described directional indicators which may be located on the panel at positions relative to the position of the detection station.

However, as more fully described below and illustrated in FIG. 8, these two last mentioned functions may be combined so as to indicate which one or more of the detectors of a multi-detector detection station are actuated and at the same time provide a directional indication of the actuating aircraft. This latter or combined function method would provide for the placement of the multiple combined indicators, which may indicate detection and direction as well as the position of the detector or detectors actuated, at a position on the lay-out, relative to the location of the detector to which the indicators respond.

Referring to FIG. 7, let it be assumed that the multi-detector detection station detector indicating apparatus is used in addition to the directional indicators operated by the relay assembly of the associated detection station.

Let it further be assumed that the five open contacts RD5-1, RD5-2, RD5-3, RD5-4 and RD5-5 represent the radiant detectors of a five detector detection station, as for example the five detectors of the multi-detector detection station off the end of the south end of runway RY2 and generally labeled RD5S in FIG. 2 and further assume that the indicator lamps DL5-1, DL5-2, DL5-3, DL5-4 and DL5-5 represent the indicator lamps generally labeled DL5 on the left side of the panel of the miniature lay-out panel in FIG. 3.

Geographically the detectors of a multi-detector detection station may be located on the ground, in a line which is perpendicular to the center line of the runway with the middle detector (detector RD5-3) on the line with the center of the runway and the other detectors off to the left and to the right of the center line of the runway, respectively. The detectors of the multi-detector detection station may be spaced some 200 feet apart, for example, and the ultra high frequency radio energy beam of each detector may be projected into the air, perpendicular to the center line of the landing runway, and may be joined together to form a wall of radiant energy, so that an airborne aircraft on its landing approach or its take-off leg may pass through this radiant energy wall so as to actuate one or more of the detectors and thus actuate the detection station of which the detectors are a part.

It should be understood that one or more detectors of a multi-detector detection station may be actuated by an aircraft flying through this wall of radiant energy according to the size of the aircraft, its altitude and its position relative to the detectors.

Let it further be assumed that an aircraft, in its landing approach, for example, approaches the landing runway RY2 from the south, passes through the wall of radiant energy and actuates one of the detectors of the RD5S group of FIG. 2, for example, the detector represented by RD5-3 of FIG. 7.

Actuation of the detector represented by RD5-3 will cause closure of the normally open contacts RD5-3 to complete a circuit from ground through contacts RD5-3, the coil of relay DD3 to a power supply. Energized relay DD3 will close its contacts 702, 703, 704 and 705.

Closure of contact 702 will complete a holding circuit for relay DD3 from a power supply through the coil of relay DD3, contact 702, lead 706, selector switch SW9, contact 709 of thermal delay relay 710 to ground. Closure of contact 703 completes a circuit to heat the heater coil of thermal delay relay 710 from a power supply through heater coil 712, lead 713, contact 703 to ground. The use of selector switch SW9 will be discussed below.

Closure of contact 704 completes a circuit to energize relay PR and the detector relay, relay D, FIG. 5 of the relay assembly of the multiple detector detection station. The circuit for energizing relay PR may be traced from a power supply through the coil of relay PR, lead 714, contact 704 to ground.

Relay PR may be a slow pull-in type relay so that the circuit for energizing the detector relay (relay D in FIG. 5) in the relay assembly of the detection station is completed for a finite period as determined by the time between energization of the coil of relay PR and actual pull in causing the opening of contacts 716. The circuit to energize the detector relay of the associated relay assembly may be traced from ground through contact 704, lead 714, diode 715, contact 716 of relay PR. The lead extending from contact 716 is connected to the lead 41′ in FIG. 5 which is connected to lead 41 of FIG. 5 and thence to the coil of relay D and thence to a positive supply. The detector DET, in FIG. 5 may be disconnected for any detection station in which the assembly in FIG. 7 is employed. After completion of the pull-in circuit for the detector relay, the relay PR may pull in and open its contact 716 to ensure against multiple pulses to the detector relay of the associated relay assembly.

Closure of contact 705 completes an illuminating circuit for the indicator lamp DL5-3, which is representative of one of the grouped indicator lamps DL5 in FIG. 3, and is in a comparable position in the line of indicator lamps DL5 illustrated on the lay-out in FIG. 3. The indicator lamp DL5-3 is also in a position comparable to the detector RD5-3, relative to the group RD5S. The illuminating circuit for DL5-3 may be traced from ground through contact 705, lead 719, to the full clockwise position of selector switch SW8, the arm of selector switch SW8, lamp DL5-3 to a power supply.

It should also be understood that completion of the energizing circuit of the detector relay of the relay assembly operates the relay assembly of the detection station the same as if the detector DET of FIG. 5 had closed its contacts to energize the detector relay. Also the directional indicator lamps, represented by No. 1 and No. 2, of that particular detection station may also be illuminated depending upon previous actuation of adjacent or next to adjacent detection stations and the direction of travel of the actuating aircraft.

With selector switch SW9 in its center position, as illustrated, the holding circuit for the relay DD3 includes contact 709 of the thermal delay relay 710.

Thermal delay relay 710 will hold its contact 709 closed until the heater coil 712 heats up enough to open contact 709, at which time the holding circuit for relay DD3 will open at contact 709 and the relay DD3 will become deenergized and release its contacts (so long as actuation of the detector has ceased) thereby deenergizing relay PR and extinguishing indicator lamp DL5-3. The time delay on the opening of contact 709 may be of the order of 20 seconds, for example.

Thus, through illumination of one or more (depending upon the wing span and position of the aircraft as it passes through the radiant energy wall over the detectors) of the indicator lamps the approximate lateral angle of approach of the actuating aircraft may be determined, relative to the center line of the landing runway.

Each of the multi-detector detection station would have its own detector indicating apparatus with as many units, such as unit 701, as there are detectors in the multi-detector detection station.

The indicator lamps of the arrangement illustrated in FIG. 7 may be positioned on the miniature layout panel at the ends of the associated runway and in positions relative to the geographical location of the detector to which it will respond or may be positioned as illustrated in FIG. 3. Other indicators such as indicators No. 1, No. 2 and No. 3 of FIG. 5, for each detection station may be positioned on the miniature layout in positions relative to the position of the grouped detectors of the detection station so as to indicate detection of an actuating aircraft and/or direction of travel of such aircraft, along with the detector indicator lamps.

However, it is not unusual practice to use one runway for landing and another runway for take-off, but more often than not, the runway used for take-off and landing is the same runway, and it may be desired to use two triangular indicator lamps configurations, in lieu of a triangular indicator configuration at the end of each runway. As indicated in FIG. 3, two such triangular indicator configurations may be used with the triangular indicator lamp configurations switched to the runway then in use.

Along these lines switch SW8 represents one method of switching one group of detector indicating lamps between certain of the runways.

The ganged switch SW8 may be used to select between the south end of runway RY2 (leads RY2S), the west end of runway RY1 (leads RY1W) or the northwest end of runway RY3 (lead RY3NW) by the positions of the ganged switch arms of switch SW8.

With the ganged switch arms in the full clockwise position, all the indicator lamps would be connected to the detector indicating illumination circuits for the south end of runway RY2 through leads RY2S, so that the indicator lamps DL5–1, DL5–2, DL5–3, DL5–4 and DL5–5 may represent the grouped detector RD5S. In the center position the arms of switch SW8 may connect the indicator lamps to the detector indicating illumination circuits for the west end of runway RY1 through leads RY1W for example, so that the indicators lamps DL5–1, DL5–2, etc., may represent the five detectors RD5W, not shown. The lead RY3NW in the full counterclockwise position would connect to the detector indicating illumination circuit for the northwest end of runway RY3 so that the indicator lamps DL5–1, DL5–2, etc., may represent the five detectors RD5NW, not fully shown.

Obviously each group of indicators in the same triangular configuration would be switched to the comparable detection stations off the end of the same runway.

Thus with two triangular grouped configuration indicator lamps, both the landing aircraft and the departing aircraft may be indicated with the grouped configuration indicator lamps switched, as desired, to connect with the detector indicating unit of the detection stations off the ends of the runway or runways then in use.

The selector switch SW9 provides for various modes of controlling the holding circuit of the energized one or more relays (DD1, DD2, etc.) upon actuation of the associated detector, and thus controlling the length of time of illumination of the detector indicator lamps.

The selector switch SW9 may be positioned in its full counterclockwise position so that the respective holding circuits of the respective relays DD1, DD2, DD3, DD4 and DD5 are open and the relays will not hold in after actuation has ceased, as previously described.

This provides for actuation of the detector, or detectors, energization of the associated relay, or relays, energization of the PR relay and illumination of the detector indicator lamp or lamps during actuation only or during the time the aircraft is physically passing through the projected beam or beams.

The length of time actuation may occur depends upon the size and speed of the aircraft and the width of the projected beam at the altitude at which the aircraft passes through the beam.

With the selector switch SW9 in its full clockwise position the holding circuits of the respective relays DD1, DD2, etc., may be controlled by the non-directional (L), or one of the directional (E or W) relays in the associated relay assembly of the detection station. As illustrated the terminal of the full clockwise position of switch SW9 continues out lead 42′, which may be the lead 42 in FIG. 5.

As previously described, when the multi-detector detection station detector indicating apparatus is employed as part of a multi-detector detection station the energizing circuit for the detector relay of the associated relay assembly is completed through a circuit controlled by one or more of the relays DD1, DD2, etc. Energization of the detector relay (relay D of FIG. 5) of the associated relay assembly provides for operation of the relay assembly, the same as if the detector relay of the relay assembly would have been energized in response to closure of the contacts DET, shown in FIG. 5.

As more fully described with reference to FIG. 5 when the relay assembly operates one of the relays L, E or W will become energized and close respectively controlled contacts, including contact L–2, E–4 or W–2 respectively. Referring to FIG. 5, it may be seen that upon closure of any one of these last named contacts ground or negative power, will be applied through the closed contact and to the lead 42. Since the lead 42 in FIG. 5 is assumed to be the lead 42′ in FIG. 7 then ground would be supplied via lead 42 in FIG. 5 to the full clockwise position terminal of switch SW9 in FIG. 7 to the moving element of switch SW9 and then through the closed holding contact of the relay then energized, so that the holding circuit for the respective relays DD1, DD2, etc., through positioning the arm of switch SW9 in its full clockwise position, may be controlled via the non-directional or one of the directional relays (L, E or W) of the relay assembly.

Thus with the holding circuits of the relays DD1, DD2, etc. of FIG. 7 controlled and held as long as the non-directional or one of the directional (L, E or W) relay of FIG. 5 remain pulled-in, the detector indicating indicator lamps may be illuminated and held illuminated for substantially the same period as the detection and direction indicating lamps No. 1 and No. 2 of FIG. 5, also controlled by the relay L, E and W as described.

It may be desired to combine the function of the detector indicator lamps such as DL5–1, DL5–2, etc., and the detection and direction indicator lamps, such as No. 1 and No. 2 of the same multi-detector detection station.

In this direction FIG. 8 is presented as part of one method and circuitry which may accomplish such end.

Referring to FIG. 5, it will be noticed that a lead 43 extends from the illuminating circuit of indicator lamp No. 2 and a lead 44 extends from the illuminating circuit of indicator lamp No. 1. The leads 43 and 44 of FIG. 5 may represent the leads 43′ and 44′ respectively of FIG. 8.

It will be noticed that the coils of the relays L, E, W and F appear in phantom form in FIG. 8 and represent the relays L, E, W and F respectively of FIG. 5. The circuitry under the relays with the numbered contacts represents similar circuitry and contacts similarly labeled in FIG. 5.

The coils of the relays DD1, DD2, DD3, DD4 and DD5 are also illustrated in phantom form in FIG. 8 and represent the relays similarly labeled in FIG. 7.

By combining the functions of the multi-detector detection station detector indicating apparatus and the circuitry for providing detection and direction indication, indicators may be provided to indicate which one or more detectors of a multi-detector detection station are actuated and, at the same time indicate that there has not yet been a direction of travel established, or if such direction of travel has been established, and indicate such direction of travel of an actuating aircraft.

To provide circuitry and apparatus to combine the indicator functions as mentioned above, the indicator illuminating circuitry and components illustrated in FIG. 7 below the broken line 7–8 would be removed and would be replaced by the circuitry and components illustrated in FIG. 8 below the broken line 7–8 in FIG. 8. The leads 43' and 44' of FIG. 8 would connect to the leads 43 and 44 respectively of FIG. 5, or as previously suggested the leads 43' and 44' may be considered to be the leads 43 and 44 respectively in FIG. 5 and in such manner the circuitry of the several figures may be connected along with the connection to lead 41' and through lead 42'.

With such combination the preferred position of selector switch SW9 is full clockwise so that the holding circuits of the relays DD1, DD2, etc. are controlled by the relay assembly through contacts of relays L, E or W.

As in FIG. 7 above, five indicator units are illustrated, however more than five or less than five indicator units may be provided, similar to the indicator block off by broken line 701', for example the same as described with reference to FIG. 7, according to the number of detectors in the multi-detector detection station.

Associated with each of the relays DD1, DD2, DD3, DD4 and DD5 are a set of two indicator lamps. Each lamp of the set of indicator lamps associated with one of the relays DD1, DD2, etc., and thus associated with one of the detectors of the multi-detector detection station is provided with an arrow to indicate opposite directions of travel so that direction of travel of the actuating aircraft may be indicated as well as its transverse position relative to the center line of the runway.

Each set of two indicator lamps, LW and LE, for example, such as the indicator lamps surrounded by the broken line box 731, in FIG. 8, may be positioned on the miniature lay-out relative to the location of its associated detector and with the arrows of each lamp of one set pointing in opposite directions of travel of an aircraft.

Thus with multiple multi-detector detection stations located off the end of a runway, such as off the south end of runway RY2 in FIG. 2, for example, a triangular configuration of indicator lamps would appear off the end of the runway or runways in lieu of at the sides of the indicator panel, as indicated in FIG. 3, for example.

Also associated with each group of sets of two indicator lamps of a multi-detector detection station would be an indicator lamp, such as LL3, in FIG. 8, which represents the indicator lamp No. 3 in FIG. 5.

Referring to FIG. 4a, and in particular the indicator lamps L12, L11 and L13, the set of lamps L12 (LW in FIG. 8) and L11 (LE in FIG. 8) would be duplicated for each detector of the multi-detector detection station but only one lamp L13 would appear for each detection station regardless of the number of detectors associated with the multi-detector detection station.

As seen in the circuitry in FIG. 8, it will be appreciated that either indicator LW or LE of the set 731, for example, or both lamps LW and LE may be illuminated depending upon which relay L, E or W, of the relay assembly is energized, assuming of course that the detector associated with the relay DD3 is actuated.

Thus, assuming now that the circuitry below the broken line 7–8 of FIG. 8 has replaced the circuitry below the broken line 7–8 of FIG. 7 and that the leads 43' and 44' of FIG. 8 are connected to the leads 43 and 44 of FIG. 5 respectively and the switch SW9 is in its full clockwise position, further assume that an aircraft passes through the radiant energy wall and actuates one of the detectors, for example RD5–3, of the multi-detector detection station.

Closure of RD5–3 completes a circuit to energize relay DD3 of FIG. 7, as previously described.

Energized relay DD3 will close its contacts 702, 703, 704 (of FIG. 7) and 732 and 733 (of FIG. 8).

Closure of contact 704 completes an energizing circuit for the detector relay (D) in the relay assembly, FIG. 5, from ground in FIG. 7 through contact 704, lead 714, diode 715, contact 716, to the lead connected to lead 41' in FIG. 5, lead 41, the coil of relay D to a positive power supply.

Energized relay D of FIG. 5 will close its contacts to pull-in relay DP, which will close its contacts.

Now, as described herein relative to FIGS. 5 and 6, either relay L or relay W or relay E will become energized and pull-in.

Assuming that relay L of FIG. 5 pulls-in, the relay L will close its contacts, including contacts L–5 and L–4 and both indicator lamps LW and LE of 731 (FIG. 8) will become illuminated. The circuit may be traced from a positive supply in FIG. 5 (also shown in FIG. 8), through contact F–1 of relay F, contact L–4 of relay L, lead 44, (which is lead 44' in FIG. 8), contact 733 of relay DD3 lamp LE to ground and from the positive supply in FIG. 5 (also shown in FIG. 8) through contact F–1, contact L–5 of relay L, lead 43, (which is lead 43' in FIG. 8) contact 732 of relay DD3 to lamp LW to ground, thus illuminating the set of indicator lamps 731 in FIG. 8.

The relay L of FIG. 5 will also close its contacts L–2 (in FIG. 5) and complete a holding circuit for relay DD3 from a positive supply in FIG. 7 through the coil of relay DD3, contact 702, lead 706, the arm of switch SW9, in its full clockwise position lead 42' which connects to lead 42 in FIG. 5, contact L–2 to ground.

Relay DD3 will cause relay PR to pull-in and thereupon relay PR will open its contact 716 to open the detector relay (D in FIG. 5) energizing circuit.

Now the relay DD3, for example, will hold in so long as relay L of the associated relay assembly is held-in, thus cooperating to maintain the indicator lamps LW and LE illuminated so long as both relays DD3 and L are held-in.

Assume now that the relay E of the relay assembly of FIG. 5 pulls-in. The relay E will close its contacts to complete a circuit to illuminate indicator lamp LE of 731 from positive power (in FIG. 5,) contact F–1, contact E–5, lead 44 (or lead 44'), contact 733, lamp LE to ground.

Closure of contact E–4 and thence lead 42 in FIG. 5 will complete the holding circuit for relay DD3 in FIG. 7.

Thus relay DD3 will be held-in by contacts of relay E and the lamp LE will be maintained illuminated through cooperation of relay DD3 in FIG. 7 and relay E in FIG. 5.

If it be assumed that the relay W were pulled in lieu of relay L or relay E then the contact W–2 (in FIG. 5) will complete the holding circuit via lead 42 in FIG. 5 and closure of contact W–3 will complete an illuminating circuit for indicator lamp LW of 731 in FIG. 8. Positive power from FIG. 5 may be applied via contact F–1, contact W–3, lead 43 (lead 43' in FIG. 8), contact 732, lamp LW to ground.

Thus cooperation of the relay DD3 in FIG. 7 and relay W in FIG. 5 may maintain illumination of lamp LW in FIG. 8.

The lamp LL3 of FIG. 8, which represents the lamp No. 3 in FIG. 5 will be illuminated as described with reference to FIG. 5 and FIG. 6.

It should be noted that if two detectors of any row of detectors of a multi-detector detection station are actuated, as for example the detectors RD5–2 and RD5–3 represented in FIG. 7, one or both of the indicator lamps LW and LE of block 731, of FIG. 8, controlled by relay DD3 and relay E, W or L, may be illuminated along with the corresponding lamp or lamps of the set of indicators 735 which is similarly controlled by the relay DD2 through actuation of RD5–2.

Referring again to FIG. 8, the arrows of the lamps of the several sets of indicators are shown all pointing horizontally for convenience of illustration. It will be understood that each set of two indicator lamps, when positioned on a miniature layout or panel, in a row of sets of indicator lamps corresponding to the row of detectors of one multi-detector detection station would have the arrows of the individual lamps of the same set pointing in opposite directions along the normal travel path with corresponding lamps of the different sets pointing in the same direction. Thus the arrows would be pointing perpendicular to the row of indicators, instead of pointing in line with the row as shown in FIG. 8.

Thus a group of sets of indicator lamps may be positioned on a panel or lay-out, transverse to the center line of the lay-out of the runway, each set of indicators in a position corresponding to the position of an associated detector of a row of detectors of a multi-detector detection station located off the end of the runway and transverse to the center line of the runway so that when any one or more detectors of the row of detectors are actuated by a passing aircraft one or both lamps of a set of indicators associated with the detector or detectors actuated by the passing aircraft may be illuminated and may indicate the direction of travel of the actuating aircraft along its path and the transverse position of the aircraft with respect to the center line of the runway, the direction indication depending on prior actuation of a detector in a preceding row representing a preceding detection station.

It has been described how the relay circuitry of certain of the relays of one relay assembly extends into certain of the other relay assemblies in a series of multiple relay assemblies of multiple detection stations. It should be understood that although FIG. 1 represents a system including ten detection stations, four of which are illustrated, in block form, and FIG. 6 shows five relay assemblies, one of which is fully illustrated, except for the outputs, in a system, any number of detection stations, similar to that illustrated in FIG. 5, may be combined in series connection of their respective relay assemblies to form a traffic surveillance system. The number of detection stations in one complete system will depend upon the length of the predetermined path to be controlled and the distance between each detector of the respective detection station. It should further be understood that the distance between detectors of one complete system need not be uniform.

It has also been described how the extreme end relay assemblies are jumpered on certain of their leads to form initiating and terminating relay assemblies of the system. Each end detection station may serve as an initiating and terminating detection station, depending on the direction of travel of the actuating vehicle throughout the system.

It will further be noticed that the system presented herein has no predetermined or pre-established direction of preferential travel, that such preferential direction is determined within the system itself upon detection of a vehicle and subsequent determination of direction of travel of such vehicle.

The traffic surveillance system is designed to permit indicated tracking of vehicles in both directions along the predetermined controlled path with an unique warning and indication when two vehicles are traveling on the same predetermined path and are on a head-on or collision course as well as other indication of travel patterns of vehicles.

Let it be assumed that a traffic indicating system includes five detection stations and that with the traffic indicating system at rest a vehicle approaches the first in a series of five detectors of the respective detection station. Using the FIGS. 5 and 6, that is FIG. 5 to illustrate the complete detection station and FIG. 6 to illustrate some of the extensions of the circuitry of the relay assemblies, the relay operation of the responding detection stations will be described.

As the vehicle, which may be a surface vehicle or an aircraft, traveling from left to right, enters the radiant energy beam of the first detector DET1, the detector will be actuated and close its contacts (included in DET1). The detector relay D1 of RA1 is energized by the circuit completed by closed contacts DET1. Relay D1 pulls-in and operates its several contacts and completes a circuit to energize and pull-in detector repeater relay DP1 via contact D1–1. The energizing circuit for relay L1 is also completed from positive power through contacts R1–1, the coil of relay L1, D1–2, E1–2 and W1–1 to ground. The energizing circuit for relay E1 is open since lead 130′, extending to the left hand side of RA1, is open. The energizing circuit for relay W1 is open at contacts WP2–1 of RA2, L2–7 of RA2 and WJ3–1 of RA3.

After a short delay relay L1 pulls in and closes contacts so that the non-directional indicator indication (lamps L11 and L12 as in FIG. 4b) is illuminated and time delay relay T1 is energized but does not pull-in. It is assumed that the switch SW2 in RA1 is open so that the lamps L11 and L12 are held illuminated and not flashed.

Energized relay L1 also closes a holding circuit from positive power via contacts R1–1, L1–1, lead 134′, a jumper connection to lead 137′, lead 136 to RA2, lead 236′ and contact EP2–2 to ground.

If another vehicle had just preceded the assumed vehicle and this second vehicle was simultaneously actuating the second detection station of which RA2 is a part the pull-in circuit for relay L1 of RA1 may be completed from the contact D1–2 through lead 135 to RA2, lead 235′, contact DP2–1 of relay DP2 of RA2 to a ground connection.

When the first assumed vehicle passes out of the radiant energy beam actuation of the detector DET1 will cease and contacts DET1 will open causing relay D1 to drop out. With relay D1 deenergized, relay DP1 becomes deenergized and drops out. Contact D1–2 opens to open the pull-in circuit of relay L1.

Relay L1 holds through its holding circuit and maintains illumination of indicator lamps L11 and L12 and energization of delay relay T1, which relay will not pull-in until the end of its delay period.

As the first assumed vehicle proceds to the right or to the east, for example, it will enter into the radiant energy beam of detector DET2 of the next detection station. Relay D2 of RA2 will become energized and pull-in upon closure of contacts DET2. Relay DP2 will become energized and pull-in through closure of contact D2–1.

Closure of contact D2–2 completes an energizing circuit for relay L2 via contacts R2–1, D2–2, E2–2 and W2–1 and closure of contact DP2–4 completes an energizing circuit for relay E2 (not shown) from a power supply via contact R2–1, the coil of relay E2, contact DP2–4, lead 230′ to RA1, lead 130 and contact L1–6 to ground. Relay E2 pulls-in immediately. The energizing circuit of relay L2 is also closed as described, but relay L2 is a delay-on-pull-in-relay and its energizing circuit is opened by the rapid pull-in of relay E2, opening its contact E2–2. Thus relay L2 does not pull-in.

Energized relay F2 closes its contacts to energize and pull-in relay EP2, via contact E2–3 and to illuminate indicator lamp L21 (as in FIG. 4c), via contact E2–5 (contact E–5 of FIG. 5) and to energize time delay relay T2, via contact E2–4. Relay E2 also closes contact E2–7 in the energizing circuit of coil C′2 of C2–C′2 but the energizing circuit is open at other contacts in the other relay assemblies to the right and relay C2–C′2 remains deenergized.

Relay E2 closes contact E2–1 which completes a holding circuit from positive power via contact R2–1, the coil of relay E2, contacts E2–1, EJ2–2 and DP2–2 to ground and also an alternate holding circuit from contact EJ2–2 lead 232 to RA3, lead 332′, contact DP3–3 to ground.

The circuitry and contacts controlling and controlled by relay E2 (not shown) of RA2, are identical in structure to the circuitry and contacts controlling and controlled by relay E3 of RA3.

When relay EP2 (not shown) becomes energized it opens its contact EP2–2 and opens the holding circuit of relay L1. Relay L1 is delayed on drop-out as well as on pull-in so that relay L1 becomes deenergized but holds in for a short time, of the order of 2 seconds, for example. Thus at this time indicator lamps L11 and L12 of RA1 and indicator lamp L21 of RA2 are all illuminated.

After the short delay relay L1 drops out and extinguishes the lamps L11 and L12 and deenergizes relay T1 which had not pulled in since it is here assumed that the delay time of relay T1 has not been exceeded. Contact L1–6 is also opened to open the pull-in circuit for relay E2. Relay E2 holds-in via its holding circuit through contacts R2–1, E2–1, EJ2–2, leads 232 and 332′ to contact DP3–3 to ground.

With the drop-out of relay L1 and extinguishing of indicator lamps L11 and L12 and the deenergization of relay T1 the relay assembly RA1 returns to a rest condition.

Relay E2 also closes its contact E2–9, (not shown) which prepares a pull-in circuit for relay EA2, (not shown).

When the actuating vehicle passes out of the beam of DET2 actuation ceases and relay D2 drops-out thereby dropping out relay DP2. Relay E2 holds pulled-in and maintains indicator lamp L21 illuminated and relay EP2 energized and pulled-in and relay T2 energized but not pulled-in.

Upon actuation of DET3 of the next detection station, of which relay assembly RA3 is a part, relay D3 pulls-in via closure of contact DET3. Relay D3 closes contact D3–1 causing relay DP3 to pull-in. Relay L3 is energized but does not pull-in, the energizing circuit including contacts R3–1, D3–2, E3–2 and W3–1. Relay E3 is energized and pulls-in to break the energizing circuit for relay L3 at contact E3–2.

Relay DP3 opens its contact DP3–3 which breaks the holding circuit for relay E2 of RA2. Relay E2 is delayed on drop-out and holds in for a short time, of the order of 2 seconds, for example while the pull-in circuit for E3 is completed from positive power through contact R3–1, the coil of relay E3, contact DP3–4, lead 330′ to RA2, lead 230 and contact EP2–1 to ground. Relay E3 closes its holding circuit which may be traced from positive power through contact R3–1, the coil of relay E3, contacts EJ3–2 and DP3–2 to ground and from EJ3–2, lead 332 to RA4, lead 432′, contact DP4–3 to ground.

Relay E3 closes contacts to illuminate indicator lamp L31, and energize time delay relay T3 and closes its contact E3–8 to complete the prepared energizing circuit for relay EA2 in RA2, from positive power via contacts E2–9, the coil of relay EA2, lead 223 to RA3, lead 323′, contact E3–8 to ground. At this time indicator lamps L21 and L31 are both illuminated, and since both relays E2 and E3 are held in relay EA2 of RA2 is energized and pulled via contacts E2–9 and E3–8.

Relay E2 drops out followed by relay EP2 of RA2, and the lamp L21 is extinguished. The energizing circuit for time delay relay T2 is also opened, relay T2 not having pulled-in. Relay EA2 is also dropped out when E2 drops-out.

When the vehicle proceeds out of the detector beam, actuation of detector DET3 ceases and relay D3 and DP3 drop out leaving relays E3, EP3 and T3 energized but with relay T3 not pulled in. The indicator lamp L31 remains illuminated.

Let it now be assumed that the vehicle stops before entering the beam of the next detector or travels very slowly that the delay period of time delay relay T3 expires and relay T3 pulls in. When relay T3 pulls-in the relay F3 becomes energized via contact T3–1 and relay F3, being a self-interrupting relay, successively opens and then closes contact F3–1 (F–1 in FIG. 5) in the illuminating circuit for lamp L31 so that the indicator lamp flashes on and off. This reaction will occur if any vehicle over stays the timed delay period of the associated T series relay.

When the vehicle moves into the beam of DET4 so as to energize and pull-in relays D4 and DP4, relay L4 will become energized and relay E4 will become energized and pull-in. The energizing circuit of relay L4 will become open at contact E4–2 and relay EP4 will become energized and pull-in via contact E4–3. Indicator lamp L41 will become illuminated and relay T4 will become energized. The holding circuit of relay E3 will be opened at contact DP4–3 but relay E3 holds in for its delayed drop-out period.

Relay EA3 will become energized and pull-in from positive power through contact E3–9, the coil of relay EA3, lead 323 to RA4, lead 423′, contact E4–8 to ground. Assuming lamp L31 had been flashing this would leave indicator lamp L31 flashing and lamp L41 illuminated steady. The energizing circuits for relays E4 and EP4 are similar to the structure of the energizing circuits for relays E3 and EP3 respectively.

Subsequent drop-out of relays E3 and EP3 will cause deenergization and drop-out of relay T3 which drops-out relay F3 while relay E3 extinguishes indicator lamp L31 and causes relay EA3 to drop-out.

If the vehicle should exit from the beam of DET4 so that relay D4 and relay DP4 are dropped-out and should then leave the predetermined path without passing through any subsequent detector beams in the series, so as to fail to operate the next detection station, as for example, if relay assembly RA4 is operated, as described and the vehicle leaves the path without operating relay assembly RA5 due to its failure to actuate detector DET5, or the relay assembly RA5 fails to respond to actuation of detector DET5, then relay E4 will hold-in due to its holding circuit not being opened at contact DP5–3. The indicator lamp L41 will, after expiration of the delayed period of relay T4, begin to flash due to relay T4 being pulled-in and its pulling-in relay F4.

In order to return the relay assembly RA4 to rest, pushbutton PB4 may be manually pushed closed to complete a pull-in circuit for relay R4. Relay R4 will pull-in and open its contact R4–1 to open the holding circuit for relay E4 thereby causing relay E4 to become deenergized and, after a short delay, to drop-out. Drop-out of relay E4 causes drop-out of relay EP4 and relay T4, and also extinguishes indicator lamp L41. Drop-out of T4 will cause flasher relay F4 to drop-out and the relay assembly RA4 would return to a rest condition.

Returning to the original assumption of normal operation of the tracking system, when the vehicle proceeds into the radiant energy beam of the last detection station of the series, the relay D5 will become energized and pull-in and cause relay DP5 to become energized and pull-in. Relay L5 will become energized but not pull-in and relay E5 will become energized and pull-in thereby opening the energizing circuit of relay L5 at contact E5–2. Relay E5 will pull-in through a circuit from a positive supply through contact R5–1, the coil of relay E5, contact DP5–4, lead 530′ to RA4, lead 430, contact EP4–1 to ground. Relay DP5 will open its contact DP5–3 and open the holding circuit of relay E4, relay E4 holding in during its delay fall out period.

With both relay E4 and E5 pulled-in relay EA4 will become energized and pull-in.

Relay EP5 will pull-in via contact E5–3 and relay T5 will become energized via contact E5–4 but relay T5 will not pull-in. Indicator lamp L51 will become illuminated and both indicator lamps L41 and L51 will then be illuminated.

Relay E4 will drop-out after the delay period and extinguish indicator lamp L41 and drop-out relays EA4 and EP4 and deenergize relay T4 thereby returning relay assembly RA4 to a rest condition.

Relay E5 of RA5 will be held in through its holding circuit including contacts R5–1, E5–1, EJ5–2 and DP5–2 to ground. The lead 535 of RA5 extending to the right would be open so that the alternate holding circuit extending into an adjacent relay assembly, similar to other E series relays to the left, would not be completed. Relay EA5 will not become energized since its energizing circuit is open at lead 523.

Now as the vehicle passes out of the beam of DET5 actuation will cease and relay D5 and DP5 will become deenergized and drop-out in order. Relay E5 having been held in through the holding circuit including contact DP5–2 will now become deenergized as relay DP5 drops-out. Relay E5 will drop-out after a short delay and will cause drop out of relay EP5 and deenergization of relay T5 and also will extinguish lamp L51, the relay assembly returning to a rest condition.

It may occur that one of the detection stations, other than the first or the last detection station in the series may fail to respond to actuation of its associated detector or that the detector itself may fail to respond to passage of a vehicle so that actuation does not occur.

Under such conditions the last actuated detection station before the detection station so failing, hereinafter referred to as "skipped," will maintain its relay of the E series held in for a longer period of time since, due to failure of the skipped detection station, the holding circuit of the last energized relay of the E series will not be opened by the relay of the DP series of the skipped detection station. The relay of the E series of the detection station last actuated before the skipped detection station will remain pulled in while the vehicle proceeds toward the beam of the detection station after the skipped detection station. In the preferred embodiment, the delayed time of the T series relay is adjusted so as to be just slightly longer than the normal travel time of a vehicle traveling from one detector beam to the next or adjacent detector beam. Thus under such conditions the delayed time would ordinarily be exceeded. At the end of the timed period of the relay of the T series time delay relay T will pull-in and cause the relay of the F series to pull-in and open its contact so that the indicator lamp will flash. The skipped detection station will provide no indicator while the next detection station (the detection station after the skipped detection station) will respond as if normal operation of the system had preceeded its actuation. The pull-in circuit of the directional (E series) relay of the detection station after the skipped detection station will be completed through operation of the relay of the EJ series of the last operated detection station, before the skipped detection station, through the associated EA series relay of the last operated detection station.

Let it be assumed that a vehicle enters the controlled path and proceeds through the first (RA1) the second (RA2) and the third (RA3) detection stations and that relay E3, EP3, and T3 are energized with E3 and EP3 pulled in and indicator lamp L31 illuminated and relay assemblies RA1 and RA2 returned to rest.

Further assume that the vehicle passes into the radiant energy beam of detector DET4 and there is a failure within the fourth (RA4) detection station so that relay assembly RA4 fails to respond.

The relay EA3 of RA3 will remain deenergized since contact E4–8 of RA4, in the energizing circuit of relay EA3, will remain open due to relay E4 remaining deenergized. With relay EA3 of RA3 remaining deenergized contact EA3–2 in the pull-in circuit of relay EJ3 will remain closed. Upon subsequent actuation of detector DET5 the relays D5 and DP5 of RA5 will pull-in and contact DP5–7 will close to complete the energizing circuit for relay EJ3 of RA3 from positive power through contact E3–9, the coil of relay EJ3, contact EA3–2, lead 324 to RA4, leads 424' and 425 to RA5, lead 525' and contact DP5–7 to ground. Relay EJ3 will pull-in and close its contact EJ3–1 and open its contact EJ3–2 to open the holding circuit of relay E3.

The energizing circuit for the relay E5 of RA5 will be completed from positive power via contacts R5–1, the coil of relay R5, contact DP5–4, lead 530' to RA4, lead 430, lead 431; to RA3, lead 331 to contact EJ3–1. Thus the relay assembly RA5 may react to actuation and maintain continuity of tracking.

The relay EJ3 opens its contact EJ3–2 and breaks the holding circuit of relay E3, the relay E3 becoming deenergized. After a short delay relay E3 drops-out. When relay E3 drops-out contact E3–9 opens and breaks the pull-in circuit of relay EJ3 and relay EJ3 drops-out. Drop-out of E3 deenergizes relay T3 which drops-out and deenergizes relay F3. Drop-out of E3 also extinguishes lamp L31. Thus the relay assembly RA3 returns to a rest condition.

A skipped detection station condition may then be indicated by the illumination of the indicator of the detection station before the skipped detection station with the indicator steady for the time delay period of the associated T relay, followed by the flashing of such last indicator of the detection station before the skipped detection station, with the flashing illuminated indication held until reset through operation of the detection station after the skipped detection station.

Another function of the EA series relays and the WA series relays is to permit vehicles to travel or proceed close behind one another without losing tracking continunity of the second or following vehicle of two vehicles. The EA series relays permit close travel from left to right or eastbound and the WA series relays permit close travel from right to left or westbound.

Referring particularly to the EA series relays, it was previously stated that when two adjacent detection stations are actuated, by two eastbound vehicles, one detection station (RA4, for example) by one vehicle and an adjacent detection station (RA3, for example) by a second or following vehicle the relay of the EA series of the RA3 relay assembly relay EA3 will be energized.

Relay E3 of RA3 will be energized and pulled-in, as previously described, by the second or following vehicle actuating the detector DET3 and relay E4 of RA4 will be energized and pulled-in, as previously described, by the first or forward vehicle actuating the detector DET4.

With both relays E3 and E4 pulled-in the relay EA3 will be energized and pulled-in via a circuit traced from positive power through contact E3–9, the coil of relay EA3, lead 323 to RA4, lead 423', contact E4–8 to ground.

Relay EA3 closes its contact EA3–1 and completes a holding circuit and opens contact EA3–2 in the pull-in circuit of relay EJ3.

Thus the first or forward vehicle may move out of the detection station of which RA4 is a part and move forward into and actuate the detection station of which RA5 is a part without causing energization of relay EJ3, although contact DP5–7 may be closed.

Thus the relay EJ3, which if pulled-in would cause drop out of E3 and loss of continuity of tracking of the second or following vehicle, is held deenergized so as to permit actuation of adjacent detection station by closely following vehicles without loss of continuity of tracking of the second or following vehicle.

The function of the WA series of relays is similar to that described for the EA series of relays except the WA series of relays are associated with right to left or westbound travel and the WA series relays are energized by pull-in of two W series relays of two adjacent detection stations and prevent pull-in of the WJ series relay of the relay assembly operated by actuation of its detector by the second or following vehicle.

It may also occur that a vehicle may enter upon the controlled path at a point somewhere between the end sections so as not to actuate the initial detection station in the series into operation. Let it be assumed that a vehicle enters upon the path at a point between, for example, the detector DET2 and detector DET3 and proceeds along the path so as to actuate detector DET3.

Upon actuation of the detector DET3 relay D3 will become energized and pull-in followed by relay DP3. Relay L3 will become energized and delay its pull-in to permit either relay E3 or W3 to pull-in, however, relay E3 will not pull-in because of open contacts L2–6, and EP2–1 of RA2 and EJ1–1 of RA1 in its energizing circuit and relay W3 will not pull-in because of open contacts WP4–1 and L4–7 of RA4 and open contact WJ5–1 of RA5 in its energizing circuit. Therefore the relay L3 will pull-in and hold through its holding circuit previously described, and energize relay T3 and also energize relay F3 via contact L3–3 which completes a circuit from a power supply through closed switch SW23 (SW2 in FIG. 5), (since detection station of which RA3 is a part, is not the first or the last detection station, switch SW23 of RA3 is closed), contact L3–2 the coil of relay F3 to ground. Relay L3 will also illuminate indicator lamps L31 and L32, via closure of contacts L3–4 and L3–5 (L–4 and L–5 in FIG. 5) which will now flash.

The vehicle may proceed to the right and actuate detector DET4. Upon closure of DET4 the detector relay D4 and the repeater detector relay DP4 will become energizing and pull-in. The relay L4 will become energized but not pull-in because of the delay on pull-in and relay E4 will become energized and pull-in because of contact L3–6 of RA3 in its pull-in circuit being closed. Relay L4 will have its energizing circuit broken and become deenergized and relay assembly RA4 will respond as if normal entrance onto the system had been made. Relay assembly RA3 will return to a rest condition upon drop-out of relay L3 via open contact EP4–2 in its holding circuit. When relay L3 drops out it will cause relays T3 and F3 to drop out and will extinguish indicator lamps L31 and L32.

As the vehicle proceeds along the path and actuates the next detector of the next detection station, normal tracking of the vehicle occurs, to termination, as previously described.

Let it now be assumed that a vehicle approaches the controlled path from its right hand end and is traveling westbound, for example, and that it enters the radiant energy beam of detector DET5 of the detection station of which relay assembly RA5 is a part. Upon actuation of the detector DET5 and closure of its contact, detector relay D5 is energized and pulls-in and operates its contacts to cause relay DP5 to become energized and pull-in via contact D5–1 and cause relay L5 to become energized via contacts R5–1, D5–2, E5–2 and W5–1. Relay L5 does not immediately pull-in due to its delay on-pull-in characteristic. Relay E5 will remain deenergized because of open contacts L4–6 and EP4–1 of RA4 and EJ3–2 of RA3 in its energizing circuit. Relay W5 will remain deenergized since its energizing circuit through lead 529 is open. Relay L5 will pull-in and close its holding circuit through contacts R5–1, L5–1, lead 534' to RA4, lead 434, contact WP4–2, lead 437 to RA5, lead 537', lead 536 to the ground connection of the terminal which is made as part of the terminating section connections.

Operated relay L5 will cause energization of time delay relay T5, and illumination of indicator lamps L51 and L52. The switch SW25 of RA5 (SW2 of FIG. 5) will be open since it is a part one of the two end detection stations.

As in each case, passage of the vehicle out of the detector beam will cease actuation of the associated detector and result in deenergization of relay D5 followed by deenergization of relay DP5 while relay L5 holds in.

Proceeding forward, to the left, the vehicle will enter the beam of detector DET4 and cause actuation of the detector resulting in completion of the energizing circuit for relay D4 via contact DET4 and relay D4 will pull-in and close its contacts and cause energization of relay DP4.

Operated relay D4 closes the energizing circuit for relay L4 at contact D4–2 which does not pull in immediately and also closes an energizing circuit for relay W4 which is completed from positive power via contact R4–1, the coil of relay W4, contact D4–4, lead 429 to RA5, lead 529' to contact L5–7 to ground, and relay W4 pulls in immediately.

Energized relay W4 opens the energizing circuit of relay L4 at contact W4–1 and closes contact W4–7 to energize relay WP4. Closure of contact W4–3 (contact W3 in FIG. 5) provides an illuminating circuit for indicator lamp L42 and closure of contact W4–4 completes an energizing circuit for time delay relay T4.

Energized relay WP4 opens its contact WP4–2 which causes relay L5 of RA5 to become deenergized. Relay L5 holds in for its delay period and at this time lamps L51 and L52 and lamp L42 are illuminated.

Relay L5 drops out at the end of its delay period and deenergizes relay T5 and extinguishes indicator lamps L51 and L52.

Energized relay W4 also closes contact W4–5 which is in the energizing circuit of relay C4. Relay C4 is connected to a ground return and is looking for a positive supply through contact W4–5 and lead 426'. Positive current may be supplied through certain contacts controlled in each relay assembly to the left, by the contacts of the associated relay of the E series through the associated relay of C' series.

It should be understood that each of the relays of the W series of each respective relay assembly, upon pull-in, closes contacts to prepare an energizing circuit for its associated relay of the C series while each of the relays of the E series of each respective relay assembly upon pull-in closes contacts to prepare an energizing circuit for its associated relay of the C' series.

Contact W4–8 is closed by W4 and prepares a circuit to pull in relay WA4 but contact W3–9 of RA3 is open to keep relay WA4 deenergized.

As the vehicle proceeds westbound, for example, and exits from the beam of DET4 actuation closes and relays D4 and DP4 drop out. When the vehicle enters into the beam of detector DET3, closure of contact DET3, through actuation results in energization and pull-in of relay D3 of RA3 which closes its contacts and pulls-in relay DP3. Relay L3 will become energized via contacts R3–1, D3–2, E3–2 and W3–1 as previously described but will not immediately pull-in. Relay W3 is energized from positive power via contact R3–1, the coil of relay W3, contact D3–4, lead 329 to RA4, lead 429' and contact WP4–1 to ground, and immediately pulls in.

Relay W3 opens contact W3–1 and causes relay L3 to become deenergized.

Contact W3–7 is closed to energize and pull in relay WP3.

Contact W3–9 is closed and completes a circuit to energize and pull-in relay WA4 of RA4 via contact W4–8, lead 420' to RA3, lead 320 and contact W3–9.

Energized relay W3 also closes contact W3–4 to energize time delay relay T3 and closes contact W3–3 to illuminate indicator lamp L32.

Energized relay DP3 opens contact DP3–5 which opens the holding circuit for relay W4 of RA4.

Contact W3–4 is closed by relay W3 to close the holding circuit for relay W3 from positive power via contact R3–1, the coil of relay W3, contacts W3–4, WJ3–2, lead 328' to RA2, lead 228 and contact DP2–5 to ground. Contact W3–5 is also closed to prepare an energizing circuit for relay C3 but relay C3 is looking for positive power through front contacts of relay E2 of RA2 or relay E1 of RA1 which relays are both deenergized.

Deenergized relay W4 of RA4 drops out and extinguishes indicator lamp L42 and deenergizes relays WP4, WA4 and T4. Relays D4 and DP4 had become deenergized upon cessation of actuation of DET4. Thus relay assembly RA4 returns to rest.

Actuation of detector DET2 by the vehicle's advance causes energization and pull-in of detector relay D2 of RA2 which pulls-in relay DP2.

Relay W2, WP2 and T2 of RA2 are pulled in similar to those described with reference to RA3 and indicator lamp L22 is illuminated. Relay WA3 is energized and pulled in through a circuit traced from positive power through contact W3–3, the coil of relay WA3, lead 320' to RA2, lead 220, contact W2–9 to ground before relay W3 drops out by the opening of its holding circuit by relay DP2 contact DP2–5, and upon drop out of relay W3, relay WA3, and relay WP3 drop-out and the energizing circuit of relay T3 is opened and indicator lamp L42 is extinguished, bring relay assembly RA3 to a rest condition.

Proceeding forward the vehicle will exit from the beam of detector DET2 and relay D2 and DP2 will drop out.

Entrance into the beam of detector DET1 will cause actuation and closure of contact DET1. Closure of contact DET1 will complete the energizing circuit for relay D1 of RA1 which will pull-in and close its contacts to energize relay DP1 via contact D1–1.

Closure of contact D1–2 completes an energizing circuit for relay L1 but relay L1 does not pull-in. Closure of contact D1–4 completes an energizing circuit for relay W3 via contacts R1–1, D1–4, lead 129 to RA2, 229' to contact WP2–1. Relay W1 pulls in immediately and opens the energizing circuit for relay L1 at contact W1–1.

Energized relay W1 holds in through its holding circuit including contacts R1–1, W1–4, WJ1–2 and DP1–6. The parallel holding circuit via lead 128' is open since this relay assembly is part of the end detection station on the left.

Energized relay DP1 opens its contact DP1–5 and opens the holding circuit for the relay W2 of RA2. After a short delay relay W2 drops out and extinguishes indicator lamp L22 and drops out the relays WP2 and relay WA2 which pulled in when both relays W2 and W1 were held-in together. Relay T2 is also deenergized.

Energized relay W1 of RA1 closes contacts to illuminate indicator lamp L12 and energize time delay relay T1, and relay WP1.

When the vehicle proceeds forward and exists from the radiant beam of detector, actuation ceases and the contacts DET1 open. Relay D1 drops-out and opens its contacts to open the energizing circuit for relay DP1. Relay DP1 drops-out and opens the holding circuit for relay W1 at contact DP1–6. Relay W1 drops-out after a short delay and extinguishes indicator lamp L12 and deenergizes relay WP1 and T1, thus returning the relay assembly RA1 to rest.

As previously described the relay WA1 of RA1 could not become energized because its energizing circuit is open since lead 120' is open.

If it should occur that a vehicle enters onto the controlled path at a point other than through the first or last detection station, as for example between detectors DET4 and DET5, the first actuated detection station will provide a non-directional detection indication. If, for example, detector DET4 were the detector to be actuated, then the relay assembly RA4 would respond by pull-in of relays D4, DP4 and L4. Relay L4 would energize relay F4 via closed switch SW24 and contact L4–3 (switch SW2 in FIG. 5 and contact L–3 in FIG. 5) and illuminate the indicators L41 and L42, which would flash.

Assuming the vehicle proceeds to the left, or westbound, it will move out of the beam of DET4 and drop out relays D4 and DP4 while relay L4 remains held-in. When the vehicle enters the beam of DET3, relays D3 and DP3 are pulled in. Relay L3 is energized but is not pulled in because of the delay-on-pull-in. Relay W3 is energized and pulled in immediately through contacts R3–1, D3–4, lead 329 to RA4, lead 429' and contact L4–7.

Energized relay W3 closes contacts to illuminate indicator L32 and energize relays WP3 and T3, relay T3 not pulling in. W3 also opens contact W3–1 and breaks the energizing circuit of L3. Contact WP3–2 is opened and breaks the holding circuit of relay L4, relay L4 becoming deenergized. After a short delay L4 drops-out, extinguishes indicators L41 and L42 and deenergizes relays F4 and T4, thus returning relay assembly RA4 to rest.

When the vehicle proceeds out of the beam of DET3 the relay assembly RA3 will respond, as previously described as if normal entrance into the system had been made and the response of relay assembly RA2 and all subsequently actuated detection stations will be similar to the described for normal response to westbound travel by a vehicle.

It may occur that one detection station between two detection stations that respond to actuation may fail to respond to actuation by a westbound vehicle. Then the relay of the WJ series of the detection station last actuated, before the skipped detection station, will become energized upon response of the detection station after the skipped detection station.

Let it be assumed that a westbound vehicle enters the controlled path and proceeds through the first (RA5), the second (RA4) and the third (RA3) detection stations along the path and that the third detection station (RA3) now has relays W3, WP3 and T3 energized with relays W3 and WP3 pulled in and indicator lamp L32 illuminated.

Further assume that the vehicle passes into the radiant energy beam of detector DET2 and there is a failure within the detection station so that relay assembly RA2 fails to respond.

The relay WA3 of RA3 will remain deenergized since contact W2–9 of RA2, in the energizing circuit of relay WA3, will remain open due to relay W2 of RA2 remaining deenergized. With relay WA3 of RA3 remaining deenergized, contact WA3–2 will remain closed. Upon subsequent actuation of detector DET1 the relays D1 and DP1 will become energized and pull-in. Relay DP1 will close its contact DP1–8 and complete the energizing circuit for relay WJ3 of RA3 from positive power via contact W3–8, the coil of relay WJ3, contact WA3–2, lead 321' to RA2, 221, 222', to RA1, 122 to contact DP1–8.

Upon closure of contact D1–2 relay L1 will become energized but will not immediately pull-in. Closure of contact D1–4 completes a pull-in circuit for relay W1 via contact R1–1, D1–4, lead 129 to RA2, lead 229', lead 227 to RA3, lead 327' to contact WJ3–1. Thus the relay assembly RA1 will respond to actuation of detector DET 1 via contacts of relay assembly RA3. The relay W3 of RA3 will have its holding circuit opened by pull-in of relay WJ3 at contact WJ3–2. After the delay period, time delay relay T3 will pull in and close contact T3–1 to energize relay F3. Relay F3 will open and close contact F3–1 and flash the indicator L32.

Relay W3 will drop-out after its delay period and extinguish lamp L32 and deenergize relays WP3, WJ3 and T3 and deenergized relay T3 will drop-out relay F3, thus returning the relay assembly RA3 to rest.

Obviously the number of detectors associated with one detection station, such as the multi-detector detection stations of the ends of the runways (FIG. 2) will have no different effect upon operation of the associated relay assembly.

It will be noted that although the descriptive terms ascent corridor, descent corridor, landing approach corridor, landing approach and air corridor may appear in this specification and in the claims herein, it will be appreciated that due to a change in wind direction an air corridor that had been used for landing aircraft before such wind shift may, after such wind shift, be used for aircraft climbing away from the runway after takeoff, so that tracking or indicating facilities may occur for either or both purposes.

It will also be appreciated that since all the relay assemblies, such as illustrated in FIG. 5 may be substantially identical in structure and components and iterative in the respective detection stations one iterative relay assembly may be substituted for another at any detection station in case of a failure of a relay assembly and thus maintenance in the system may be simplified by maintaining additional relay assemblies.

It will further be appreciated that the radar detectors may include various types of radiant energy detectors including those operating on the Doppler principle, for example.

While a preferred embodiment of the invention and certain variations have been set forth, it will be appreciated by those skilled in the art that various other modifications and other rearrangements of sections and/or parts of the system may be made without departing from the spirit of the invention within the scope of the objects and claims.

I claim:

1. In a tracking system for aircraft traveling along a predetermined path, a series of aircraft actuated detection stations spaced along said path, an interconnected relay system for said series of stations and including for each detection station, first relay means operable for providing an output indication of an aircraft traveling in a first direction in response to a sequence of actuations by said aircraft at a succession of said detection stations including the station with which said first relay means is associated and a preceding station in said first direction, second relay means operable for providing an output indication of an aircraft traveling in second direction opposite to the first in response to a sequence of actuations by an aircraft at a succession of said detection stations including the station with which said second relay means is associated and a preceding station in said second direction, alarm circuit means, and additional relay means including circuits controlled by the several first and second relay means for the series of detection stations for operating said alarm circuit means in response only to concurrent operation of said first relay means for any one of said stations and one of said second relay means for any other of said stations succeeding said one station in said first direction.

2. A combination as in claim 1, and in which said additional relay means includes a pair of relay coils for each detection station, contacts controlled by energization of either of said coils for operating said alarm circuit means, and said circuits including normally closed contacts of all unoperated said first and second relay means intervening between the nearest spaced said operated first and second relay means and normally open but currently closed contacts of said concurrently operated first and second relay means, said circuit energizing the first of the two coils for one of the said two stations and the second of the corresponding two coils for the other of the said two stations, and said normally closed contacts and normally open contacts for any one first relay means having a common moving contact, and said normally closed contacts and normally open contacts for any one second relay means having a common moving contact, and the normally closed contacts for the first and second relay means for each station being arranged in the series circuit in order in which the contact for the first relay follows that of the second relay in the first direction.

3. In a centralized tracking system for tracking vehicles traveling on or somewhat above the surface of the ground along a predetermined path, a display panel in miniature of said path, a series of spaced detection stations along said path, directional indicators for the respective stations and located on said display panel relative to the positions of the associated said detection stations along said path, each said detection station including vehicle actuable detection means responsive to passage of a vehicle, a relay assembly for each detection station and interconnected with corresponding relay assemblies of other said detection stations for providing outputs from each said relay assembly for control of said indicators for indicating presence and direction of travel of tracked vehicles in response to vehicle actuation of said detection means at a succession of said detection stations, each said relay assembly including a first relay means operable for providing a first said output for operating the indicator for a first direction of travel in response to a sequence of actuations of said detector means by a vehicle at a succession of said detection stations in said first direction including the detection station with which said first relay means is associated and a preceding station, a second relay means operable for providing a second said output for operating the indicator for a second direction of travel opposite to the first and alarm circuit means for each detection station, and further relay means for each detection station and including circuits controlled by the several first and second relay means of the several relay assemblies for the series of detection stations for operating said alarm circuit means in response only to concurrent operation of one said first relay means for one of said detection stations and of one of said second relay means of another of said detection stations for opposite directions corresponding only to a potential collision course of vehicles approaching each other.

4. In a centralized tracking system for tracking vehicles traveling on or somewhat above the surface of the ground along a predetermined path, a display panel in miniature of said path, a series of spaced detection stations along said path, forward and reverse directional indicators for the respective detection stations and located on said display panel relative to the positions of the associated said detection stations along said path, each said detection station including vehicle actuable detection means responsive to passage of a vehicle, a relay assembly for each detection station and interconnected with corresponding relay assemblies of other of said detection stations for providing outputs from each said relay assembly for control of said indicators for indicating presence and direction of travel of tracked vehicles, each said relay assembly including a first relay means operable for providing a first said output for operating said forward indicator for a first direction of travel in response to vehicle actuation of the detection means at a succession of said detection stations in said first direction and including the detection station with which said first relay means is associated and a preceding station, a second relay means for providing a second said output for operating said reverse indicator for a second direction of travel opposite to the first in response to vehicle actuation of the detection means at a succession of said detection stations in said second direction and including the detection station with which said second relay is associated and a preceding station and another relay means for providing a combined output of said first output and said second output for operating both said forward and reverse indicators for its associated detection station in response to actuation of said detection means of any one said detection station of said series of detection stations without operation of either said first relay means or said second relay means of said one detection station.

5. A combination as in claim 4 and including means for locking in said other relay means to maintain operation of said forward and reverse indicators, and means controlled by the corresponding first relay means for the next succeeding station in the first direction and the corresponding second relay means for the next following station in said second direction for interrupting said locking means to release said other relay means.

6. In a relay system for use in progressively indicating the passage of one or more vehicles along a travel path by the latest actuated of a series of spaced detection stations individually actuable by passage of a vehicle thereby along said path and adapted for concurrently so indicating individually, plural vehicles spaced along said series of detection stations proceeding in either direction along said path, an iterative relay assembly for each direction of a series of detection stations for connection to corresponding preceding and succeeding similar relay assemblies for said series of detection stations, said iterative relay assembly including for each direction for any one station, direction indicative relay means operable for providing an output for said latest actuated indication in its direction, circuit means controlled by actuation of said one detection station and for control by the corresponding relay means for the preceding station in its direction for so operating said direction indicative relay means in response to actuation at said one station while said corresponding relay means is operated, adjacent station sequence indicative relay means and circuit means for operating the latter relay means in response to concurrent operation of the direction indicative relay means for said one station and of the corresponding relay means for the next succeeding station in its direction and circuit means for maintaining said adjacent station sequence indicative relay means operated with said direction indicative relay means to be released with the latter, station skipping relay means and circuit means for operating the last named relay means in response to concurrent operation of said direction indicative relay means for said one station and non-operation of said adjacent station sequence indicative relay means and actuation of the second succeeding detection station in its direction, auxiliary circuit means for operating the corresponding direction indicative relay means for the second succeeding detection station in its direction in response to actuation of the latter detection station and concurrent operation of said station skipping relay means of said one station, and holding circuit means for maintaining said direction indicative relay means for said one station operated after initial said operation thereof and including means for releasing said last named direction indicative relay means in response to actuation of the next succeeding station in its direction and in response to operation of said station skipping relay means in absence of said last mentioned actuation.

7. A combination as in claim 6 and said iterative relay assembly further including in common for both directions for said one station, relay means operable for providing an output for non-directional indication and circuit means for operating said non-directional relay means in response to actuation of said one detection station together with concurrent non-operation of the respective two direction indicative relay means for the respective opposite directions for said one station, and holding circuit means for maintaining said non-directional indicative relay means operated after being initially so operated and for releasing said non-directional indicative relay means in response to operation of the direction indicative relay means for one direction away from said one station for the succeeding station in said one direction and in response to operation of the direction indicative relay means for the other direction away from said one station for the succeeding station in said other direction.

8. A combination as in claim 6 and said iterative relay assembly also including relay means including two coils, output circuit means controlled by operation of either of said two coils, circuit means for operating one of said coils for said one station in conjunction with the opposite of the two corresponding coils for any station in one direction and including a make contact and cooperating moving contact of the direction indicative relay for one direction for said one station for connection of said moving contact to a corresponding moving contact of the direction indicative relay for the other direction for the next succeeding station in said one direction, and further circuit means for operating the other of said two coils for said one station and including a make contact and cooperating moving contact of the direction indicative relay for the other direction for said one station for connection of the last named moving contact to a corresponding moving contact of the direction indicative relay for said one direction for the next succeeding station in said other direction, and break contacts individual to the respective said moving contacts for said one station, said break contacts for said one station being connected in series.

9. A system for centralized tracking of aircraft along a predetermined path and including a display panel, a series of aircraft detection stations spaced along said path, a forward indicator and a reverse indicator on said panel for first and second opposite directions along said path and individual to each of the respective detection stations, and an interlocking relay system including for each station, a forward relay means operable for operating the forward indicator for its own said station, a reverse relay means operable for operating the reverse indicator for its own said station, means for operating said forward relay means in response to aircraft detection by its associated detection station when the corresponding relay means for the preceding detection station in the forward direction is operated, means for holding said forward relay means operated after said aircraft detection and until aircraft detection by the next succeeding detection station in the forward direction and then releasing it, further relay means operated responsive to concurrent operation of said forward relay means and the corresponding forward relay means for the succeeding detection station in the forward direction and holding operated thereafter with the first mentioned said forward relay means alone until said first mentioned forward relay means is released, additional relay means operated by aircraft detection at the second succeeding detection station in the forward direction when said further relay means is not operated as in absence of detection of aircraft at said next succeeding station, and means controlled by operation of said additional relay means for providing an auxiliary means for operting the corresponding forward relay means for the second succeeding detection station in the forward direction in response to aircraft detection at the latter station in event of absence of detection of aircraft at said succeeding station, the corresponding said additional relay means and means for the second preceding detector station serving similarly to provide an auxiliary means for operation of said forward relay means for said one station in response to aircraft detection at its associated detection station in event of absence of operation of the corresponding forward relay means at said next preceding detection station, and means controlled by said additional relay means for releasing said first mentioned forward relay means in absence of aircraft detection at said next succeeding detection station, and said relay system for each station being symmetrical with respect to forward and reverse directions in including additional means corresponding in the opposite directional sense for control of operation of the reverse relay means.

10. A system as in claim 9 and said interlocking relay system including for each detection station, detector relay means operable responsive to detection of aircraft at its station to provide in connection with other said relay means the aforesaid operations controlled by aircraft detection or absence thereof respectively.

11. A system for centralized tracking of aircraft proceeding along an approach or climb air corridor for a runway including a series of aircraft detection stations comprising a succession of rows of aircraft detectors, said rows being transverse to a line comprising an extension of the center line of the runway and being spaced along said line, said rows having progressively greater number of spaced detectors and progressively greater length transverse to said line as the spacing of each respective said row from the end of the runway increases, the individual detectors of each row being adapted to be individually actuated by passage of aircraft overhead along said air corridor, a remote panel representing a miniature plan of said air corridor in relation to the runway, corresponding rows of indicators located on said panel representative of said rows of detectors, means for coupling the indicators of each row individually to the respective detectors of the corresponding said row, and means for providing for each row of detectors a common output in response to actuation of any of said detectors in said row but separate from the output for the other rows, a tracking position indicator on said panel for each of said detection stations, and an interlocking relay system for operation of said tracking position indicators and including means controlled by said common outputs for operating and releasing said last named indicators progressively in sequence in response to aircraft detection by said rows of detectors in sequence as provided by said common inputs from the respective rows, said last named means including means for holding operated the tracking position indicator for the latest actuated row of detectors until a succeeding row of detectors is actuated.

12. A system for centralized tracking of aircraft proceeding along an approach or climb air corridor for a runway including a series of spaced aircraft detection stations comprising a succession of rows of aircraft detectors, said rows being transverse to a line comprising an extension of the center line of the runway and being spaced along said line at progressively greater distances from the end of the runway, said rows having progressively greater number of spaced detectors and progressively greater length transverse to said line as the spacing of the rows from the end of the runway increases, the detectors of each row being adapted to be individually actuated by passage of aircraft substantially overhead along said air corridor to provide individual outputs therefor, a remote panel representing a miniature plan of said air corridor in relation to the runway, corresponding rows of directional tracking position indicators located on said panel representative of said rows of detectors, the individual tracking indicators of each row being representative of individual detectors of the corresponding row of detectors, and an interlocking relay system for operation of said tracking position indicators and including means for operating and releasing at least one of said directional tracking indicators of respective rows progressively in sequence in response to successive said outputs in reponse to aircraft detection by said rows of detectors in sequence and corresponding to the direction of said sequence, said last named means including means for holding operated the tracking position indicator for the latest actuated row of detectors until a detector of a succeeding row of detectors is actuated, and means coupling said individual detectors of each row to the individual tracking indicators for each row via said means for so operating and releasing only the one or more tracking indicators of any one row whose corresponding one or more detectors have been actuated.

References Cited in the file of this patent

UNITED STATES PATENTS

| 2,468,045 | Deloraine | Apr. 26, 1949 |
| 2,488,815 | Hailes | Nov. 22, 1949 |
| 2,535,954 | Preston | Dec. 26, 1950 |
| 2,622,140 | Muller | Dec. 16, 1952 |
| 2,672,393 | Copper | Mar. 16, 1954 |
| 3,004,258 | Cohen et al. | Oct. 10, 1961 |
| 3,087,140 | O'Neill | Apr. 23, 1963 |

FOREIGN PATENTS

| 568,622 | Great Britain | Apr. 12, 1945 |